(12) United States Patent
Zenz et al.

(10) Patent No.: US 8,838,750 B2
(45) Date of Patent: Sep. 16, 2014

(54) SYSTEM AND METHOD FOR SYSTEM INFORMATION CENTRALIZATION

(75) Inventors: Ingo Zenz, Epfenback (DE); Krasimir P. Semerdzhiev, Sofia (BG); Elitsa N. Pancheva, Blagoevgrad (BG); Mladen L. Markov, Varna (BG)

(73) Assignee: SAP AG, Walldorf (DE)

( * ) Notice: Subject to any disclaimer, the term of this patent is extended or adjusted under 35 U.S.C. 154(b) by 1178 days.

(21) Appl. No.: 11/324,125

(22) Filed: Dec. 30, 2005

(65) Prior Publication Data

US 2007/0156904 A1  Jul. 5, 2007

(51) Int. Cl.
*G06F 15/177* (2006.01)
*G06F 9/445* (2006.01)
*G06F 15/173* (2006.01)
*G06F 15/16* (2006.01)

(52) U.S. Cl.
CPC ................... *G06F 9/44505* (2013.01)
USPC ............ 709/220; 709/219; 709/223; 709/228

(58) Field of Classification Search
USPC ......... 709/226, 331, 332, 220, 223, 228, 219; 717/4, 1, 10, 166; 707/3, 509
See application file for complete search history.

(56) References Cited

U.S. PATENT DOCUMENTS

| | | |
|---|---|---|
| 5,479,599 A | 12/1995 | Rockwell et al. |
| 5,608,865 A | 3/1997 | Midgely et al. |
| 5,758,154 A | 5/1998 | Qureshi |
| 5,832,503 A | 11/1998 | Malik et al. |
| 5,996,012 A | 11/1999 | Jarriel |
| 6,041,347 A | 3/2000 | Harsham et al. |
| 6,055,227 A | 4/2000 | Lennert et al. |
| 6,148,277 A | 11/2000 | Asava et al. |
| 6,161,176 A | 12/2000 | Hunter et al. |
| 6,209,018 B1 * | 3/2001 | Ben-Shachar et al. ........ 718/105 |
| 6,314,460 B1 | 11/2001 | Knight et al. |
| 6,341,372 B1 | 1/2002 | Datig |
| 6,397,378 B1 | 5/2002 | Grey et al. |
| 6,421,719 B1 | 7/2002 | Lewis et al. |
| 6,490,690 B1 | 12/2002 | Gusler et al. |
| 6,523,022 B1 | 2/2003 | Hobbs |
| 6,553,491 B1 * | 4/2003 | Dover .......................... 713/100 |

(Continued)

FOREIGN PATENT DOCUMENTS

| | | |
|---|---|---|
| EP | 1486867 A1 | 12/2004 |
| GB | 2374687 A | 10/2002 |

(Continued)

OTHER PUBLICATIONS

Int'l Application No. PCT/EP2006/012421, Int'l Search Report & Written Opinion dated Oct. 2, 2007; 14 pages.

(Continued)

*Primary Examiner* — Asad Nawaz
*Assistant Examiner* — Stephanie Chang
(74) *Attorney, Agent, or Firm* — Schwegman Lundberg & Woessner, P.A.

(57) ABSTRACT

A system and method for configuration using abstract configuration information is described. In an embodiment, an abstract configuration module acts like an informational proxy between components of a system. The configuration module provides a level of abstraction that allows for some properties to be abstracted instead of being hard coded into each node of the system.

15 Claims, 15 Drawing Sheets

(56) References Cited

U.S. PATENT DOCUMENTS

| | | | |
|---|---|---|---|
| 6,643,711 B2 | 11/2003 | Bracha et al. |
| 6,735,691 B1 | 5/2004 | Capps et al. |
| 6,832,298 B2 | 12/2004 | Fujii et al. |
| 6,871,221 B1 | 3/2005 | Styles |
| 6,898,703 B1 | 5/2005 | Ogami et al. |
| 6,925,646 B1 | 8/2005 | Korenshtein et al. |
| 6,950,931 B2 | 9/2005 | Wedlake |
| 6,996,517 B1 | 2/2006 | Papaefstathiou |
| 7,054,924 B1 | 5/2006 | Harvey et al. |
| 7,167,974 B2 | 1/2007 | Roth et al. |
| 7,188,335 B1 | 3/2007 | Darr et al. |
| 7,200,662 B2 | 4/2007 | Hasan et al. |
| 7,228,551 B2 | 6/2007 | Karagounis et al. |
| 7,246,345 B1 | 7/2007 | Sharma et al. |
| 7,260,818 B1 | 8/2007 | Iterum et al. |
| 7,320,007 B1 | 1/2008 | Chang |
| 7,328,259 B2 | 2/2008 | Srinivasan et al. |
| 7,343,601 B2 | 3/2008 | Azagury et al. |
| 7,373,661 B2 | 5/2008 | Smith et al. |
| 7,398,471 B1 | 7/2008 | Rambacher et al. |
| 7,412,687 B2 | 8/2008 | Goodwin et al. |
| 7,447,701 B2 | 11/2008 | Agarwal et al. |
| 7,447,755 B1 | 11/2008 | Maxted et al. |
| 7,480,643 B2 | 1/2009 | Barsness et al. |
| 7,483,970 B2 | 1/2009 | Anuszczyk et al. |
| 7,779,389 B2 | 8/2010 | Markov et al. |
| 7,793,087 B2 | 9/2010 | Zenz et al. |
| 7,797,522 B2 | 9/2010 | Zenz et al. |
| 8,201,189 B2 | 6/2012 | Semerdzhiev et al. |
| 2002/0138652 A1* | 9/2002 | Taylor ............ 709/246 |
| 2003/0041235 A1 | 2/2003 | Meyer |
| 2003/0055529 A1 | 3/2003 | Aosawa |
| 2003/0076349 A1* | 4/2003 | Slaby ............ 345/735 |
| 2003/0135638 A1 | 7/2003 | Brabson et al. |
| 2003/0221094 A1 | 11/2003 | Pennarun |
| 2003/0225867 A1 | 12/2003 | Wedlake |
| 2004/0117452 A1 | 6/2004 | Lee et al. |
| 2004/0133689 A1* | 7/2004 | Vasisht ............ 709/228 |
| 2004/0143823 A1 | 7/2004 | Wei |
| 2004/0162930 A1* | 8/2004 | Forin et al. ............ 711/1 |
| 2004/0187140 A1 | 9/2004 | Aigner et al. |
| 2004/0205584 A1 | 10/2004 | Pezzanite et al. |
| 2004/0230787 A1 | 11/2004 | Blumenau et al. |
| 2005/0005005 A1 | 1/2005 | Styles et al. |
| 2005/0050175 A1 | 3/2005 | Fong et al. |
| 2005/0055449 A1* | 3/2005 | Rappold, III ............ 709/228 |
| 2005/0065993 A1 | 3/2005 | Honda et al. |
| 2005/0071195 A1 | 3/2005 | Cassel et al. |
| 2005/0085937 A1 | 4/2005 | Goodwin et al. |
| 2005/0144428 A1 | 6/2005 | Rothman et al. |
| 2005/0144528 A1 | 6/2005 | Bucher et al. |
| 2005/0144610 A1 | 6/2005 | Zenz |
| 2005/0240667 A1 | 10/2005 | Koegel |
| 2005/0256732 A1 | 11/2005 | Bauer et al. |
| 2005/0289169 A1 | 12/2005 | Adya et al. |
| 2006/0041595 A1 | 2/2006 | Taguchi et al. |
| 2006/0041881 A1 | 2/2006 | Adkasthala |
| 2006/0047798 A1 | 3/2006 | Feinleib et al. |
| 2006/0064673 A1 | 3/2006 | Rogers et al. |
| 2006/0123409 A1 | 6/2006 | Jordan, III et al. |
| 2006/0150178 A1 | 7/2006 | Jerrard-Dunne et al. |
| 2006/0165123 A1 | 7/2006 | Jerrard-Dunne et al. |
| 2006/0165223 A1 | 7/2006 | Dugan et al. |
| 2006/0173984 A1 | 8/2006 | Emeis et al. |
| 2006/0190579 A1 | 8/2006 | Rachniowski et al. |
| 2006/0242626 A1 | 10/2006 | Pham et al. |
| 2006/0242634 A1 | 10/2006 | Fleischer et al. |
| 2007/0061428 A1 | 3/2007 | Haley et al. |
| 2007/0094359 A1 | 4/2007 | Lamoureux |
| 2007/0118654 A1 | 5/2007 | Jamkhedkar et al. |
| 2007/0118888 A1 | 5/2007 | Styles |
| 2007/0143480 A1 | 6/2007 | Arroyo et al. |
| 2007/0156388 A1 | 7/2007 | Kilian et al. |
| 2007/0156389 A1 | 7/2007 | Kilian et al. |
| 2007/0156431 A1 | 7/2007 | Semerdzhiev et al. |
| 2007/0156432 A1 | 7/2007 | Mueller et al. |
| 2007/0156641 A1 | 7/2007 | Mueller |
| 2007/0156715 A1 | 7/2007 | Mueller |
| 2007/0156717 A1 | 7/2007 | Zenz et al. |
| 2007/0157010 A1 | 7/2007 | Zenz et al. |
| 2007/0157172 A1 | 7/2007 | Zenz et al. |
| 2007/0157185 A1 | 7/2007 | Semerdzhiev et al. |
| 2007/0162892 A1 | 7/2007 | Zenz et al. |
| 2007/0165937 A1 | 7/2007 | Markov et al. |
| 2007/0168965 A1 | 7/2007 | Zenz et al. |
| 2007/0257715 A1 | 11/2007 | Semerdzhiev et al. |

FOREIGN PATENT DOCUMENTS

| | | |
|---|---|---|
| WO | WO-9626588 A1 | 8/1996 |
| WO | WO-2004109978 A1 | 12/2004 |
| WO | WO-2005045670 A1 | 5/2005 |
| WO | WO-2007076944 A1 | 7/2007 |

OTHER PUBLICATIONS

USPTO, 6570P333 OA mailed Dec. 9, 2008 for U.S. Appl. No. 11/322,607.

U.S. Appl. No. 11/322,400, Non Final Office Action mailed May 23, 2008, 9 pgs.

U.S. Appl. No. 11/322,400, Notice of Allowance mailed May 18, 2009, 7 pgs.

U.S. Appl. No. 11/322,401, Advisory Action mailed Feb. 26, 2009, 5 pgs.

U.S. Appl. No. 11/322,401, Ex-Parte Reexamination Office Action Mailed Mar. 30, 2010, 4 pgs.

U.S. Appl. No. 11/322,401, Final Office Action mailed Nov. 19, 2008, 7 pgs.

U.S. Appl. No. 11/322,401, Non Final Office Action mailed May 21, 2009, 10 pgs.

U.S. Appl. No. 11/322,401, Non Final Office Action mailed May 22, 2008, 7 pgs.

U.S. Appl. No. 11/322,401, Notice of Allowance mailed Jun. 1, 2010, 5 pgs.

U.S. Appl. No. 11/322,401, Notice of Allowance mailed Dec. 31, 2009, 4 pgs.

U.S. Appl. No. 11/322,401, Preliminary Amendment filed Mar. 16, 2009, 11 pgs.

U.S. Appl. No. 11/322,401, Response filed Feb. 19, 2009 to Final Office Action mailed Nov. 19, 2008, 7 pgs.

U.S. Appl. No. 11/322,401, Response filed Apr. 14, 2010 to Ex Parte Quayle Action mailed Mar. 30, 2010, 4 pgs.

U.S. Appl. No. 11/322,401, Response filed Aug. 22, 2008 to Non Final Office Action mailed May 22, 2008, 17 pgs.

U.S. Appl. No. 11/322,401, Response filed Sep. 16, 2009 to Non Final Office Action mailed May 21, 2009, 10 pgs.

U.S. Appl. No. 11/322,509, Non Final Office Action mailed Jan. 14, 2009, 11 pgs.

U.S. Appl. No. 11/322,511, Non Final Office Action mailed Jan. 22, 2009, 13 pgs.

U.S. Appl. No. 11/322,597, Non-Final Office Action mailed Feb. 5, 2010, 8 pgs.

U.S. Appl. No. 11/322,597, Response filed May 5, 2010 to Non Final Office Action mailed Feb. 5, 2010, 14 pgs.

U.S. Appl. No. 11/322,607, Non Final Office Action Jun. 26, 2008, 15 pgs.

U.S. Appl. No. 11/322,608, Final Office Action mailed Jul. 8, 2009, 9 pgs.

U.S. Appl. No. 11/322,608, Final Office Action mailed Sep. 4, 2008, 11 pgs.

U.S. Appl. No. 11/322,608, Non Final Office Action mailed Feb. 13, 2009, 8 pgs.

U.S. Appl. No. 11/322,608, Non Final Office Action mailed Feb. 20, 2008, 8 pgs.

U.S. Appl. No. 11/322,628, Non-Final Office Action mailed Sep. 4, 2009, 14 pgs.

U.S. Appl. No. 11/322,628, Notice of Allowance mailed Jun. 1, 2010, 10 pgs.

(56) References Cited

OTHER PUBLICATIONS

U.S. Appl. No. 11/322,628, Response filed Dec. 2, 2009 to Non Final Office Action mailed Sep. 4, 2009, 16 pgs.
U.S. Appl. No. 11/322,701, Final Office Action mailed Sep. 2, 2008, 16 pgs.
U.S. Appl. No. 11/322,701, Non Final Office Action mailed Mar. 19, 2008, 11 pgs.
U.S. Appl. No. 11/322,701, Non-Final Office Action mailed Jul. 6, 2009, 15 pgs.
U.S. Appl. No. 11/322,802, Non-Final Office Action mailed May 14, 2010, 36 pgs.
U.S. Appl. No. 11/322,969, Non-Final Office Action mailed Apr. 4, 2010, 11 pgs.
U.S. Appl. No. 11/322,969, Response filed Jun. 9, 2009 to Non Final Office Action mailed Apr. 1, 2009, 11 pgs.
U.S. Appl. No. 11/323,059, Final Office Action mailed Mar. 4, 2010, 10 pgs.
U.S. Appl. No. 11/323,059, Non-Final Office Action mailed Aug. 12, 2009, 11 pgs.
U.S. Appl. No. 11/323,059, Response filed Nov. 6, 2009 to Non Final Office Action mailed Aug. 12, 2009, 10 pgs.
U.S. Appl. No. 11/323,110, Non Final Office Action mailed Nov. 26, 2008, 10 pgs.
U.S. Appl. No. 11/323,110, Notice of Allowance mailed Feb. 17, 2010, 4 pgs.
U.S. Appl. No. 11/323,110, Notice of Allowance mailed May 29, 2009, 9 pgs.
U.S. Appl. No. 11/323,110, Notice of Allowance mailed Oct. 20, 2009, 6 pgs.
U.S. Appl. No. 11/323,110, Response filed Feb. 25, 2009 to Non Final Office Action mailed Nov. 26, 2008, 9 pgs.
U.S. Appl. No. 11/323,110, Response filed Oct. 27, 2008 to Restriction Requirement mailed Aug. 27, 2008, 10 pgs.
U.S. Appl. No. 11/323,110, Restriction Requirement mailed Aug. 27, 2008, 7 pgs.
U.S. Appl. No. 11/323,438, Non Final Office Action mailed Apr. 1, 2009, 21 pgs.
U.S. Appl. No. 11/323,438, Response filed Jun. 30, 2009 to Non Final Office Action mailed Apr. 1, 2009, 14 pgs.
U.S. Appl. No. 11/324,125, Non Final Office Action mailed Jan. 23, 2009, 8 pgs.
International Application Serial No. PCT/EP2006/012356, International Search Report and Written Opinion mailed Mar. 29, 2007, 8 pgs.
International Application Serial No. PCT/EP2006/012357, International Search Report and Written Opinion mailed Mar. 29, 2007, 9 pgs.
International Application U.S. Appl. No. PCT/EP2006/012358, International Search Report and Written Opinion dated Jun. 14, 2007, 11 pgs.
"J2EE Engine Bootstrap", *BIS Techdev*, printed on Sep. 26, 2005 [Online]. Retrieved from the Internet <URL: http://bis.wdf.sap.corp/twiki/bin/view/Techdev/J2EEEngineBootstrap>, 1-15.
"Microsoft Computer Dictionary", *Microsoft Press*, 4th Edition, Redmond, WA, (1999), 123 & 183.
"Using a Template Processor to Simplify Programming", *Research Disclosure, Mason Publications*, Hampshire, GB, vol. 41, No. 413, (Sep. 1, 1998), 3 pgs.
Accomazzi, Alberto, et al., "Mirroring the Ads Bibliographic Databases"*Astronomical Analysis Software and Systems VII, ASP Conference Series*, vol. 145, (1998), 395-399.
Bartell, Randy L., et al., "MediaXact System—A Framework for Personalized Electronic Commerce Systems", *Bell Labs Technical Journal*, vol. 4, Issues 153-173, (Apr.-Jun. 1999), 153-173.
Clark, et al., "Enabling Domain Experts to Convey Questions to a Machine: A Modified, Template-Based Approach", *ACM*, (2003), p. 13-19.
Cutler, Ellie, "SCO Unix in a Nutshell", *O'Reilly & Associates, Inc.*, Cambridge, MA, (Jan. 1994), 154-158.
Duquette, William H., et al., "Data Definition and Code Generation in TCL", *RIDE-VE '99*, Sydney, Australia, (Mar. 23-24, 1999), 1-10.
Feller, Peter H., "Software Process Support Through Software Configuration Management", *IEEE*, (1990), 58-60.
Fernandez, Mary, et al., "Silkroute: Trading Between Relations and XML", *Computer Networks*, vol. 33, Issues 1-6, (Jun. 2000), 723-745.
Hall, et al., "Design: A Generic Configuration Shell, Proc of the 3rd International Conf. on industrial and engineering applications of artificial intelligence and expert systems", vol. 1, Charleston, SC 1990, (1990), 500-508 pgs.
Hatley, John W., "Automatically Generating Procedure Code and Database Maintenance Scripts", *Ingres World*, Chicago, IL, (Oct. 2-6, 1994), 11 pgs.
Heiss, Kurt, "Oracle Process Manager and Notification Server: Administrator's Guide", *10g Release 2 (10.1.2)*, [Online]. Retrieved from the Internet: <URL: http://download.oracle.com/docs/cd/B14099_01/core.1012/b13996.pdf> [retrieved on Sep. 31, 2007], (Dec. 2004), 1-1 to 1-26, & 3-1 to 3-30.
Karlsson, et al., "Method Configuration: Adapting to situational characteristics while creating reusable assets", *Information and software technology*, vol. 46, Issue 9, (Jul. 1, 2004), 619-633 pgs.
Leffler, et al., "Building Berkeley UNIX Kernels with Config", *Computer Systems research Group*, (Apr. 17, 1991), 2-1 and 2-31 pgs.
Robbins, et al., "Unix in a nutsehll", 3rd edition, O'Reily and Associates, INC, (Aug. 1999), 215-221, and 265-266 pgs.
Schlee, Max, et al., "Generative Programming of Graphical User Interfaces", *ACM*, (2004), 403-406.
Schwanke, et al., "Configuration Management in BiiN SMS", *Proc. of the 11th International Conf. on software engineering Pittsburgh*, (383-393 pgs), 1989.
Symantec, Corp., "Norton Ghost™ User's Guide", *Norton Ghost™ User's Guide—Symantec. Norton Ghost The fast pc cloning solution.*, (1999), 138 pgs.
William, et al., "Embedded Linux as a platform for dynamically self-reconfiguration systems-ON-CHIP", (21-24 pgs.), 163-169 pgs.
U.S. Appl. No. 11/322,597 Final Office Action mailed Jul. 30, 2010, 9 pgs.
U.S. Appl. No. 11/322,597, Response filed Sep. 17, 2010 to Final Office Action mailed Jul. 30, 2010, 17 pgs.
U.S. Appl. No. 11/322,802 Final Office Action mailed Sep. 30, 2010, 30 pgs.
U.S. Appl. No. 11/322,802, Response filed Aug. 3, 2010 to Non Final Office Action mailed May 4, 2010, 15 pgs.
U.S. Appl. No. 11/323,059 Non-Final Office Action mailed Sep. 30, 2010, 12 pgs.
U.S. Appl. No. 11/323,059, Response filed Aug. 4, 2010 to Final Office Action mailed Mar. 4, 2010, 9 pgs.
Cao, et al., "Dynamic configuration management in a graph-oriented Distributed Programming Environment", Elsevier Science BV,, (2003), pp. 43-65.
U.S. Appl. No. 11/322,597, Response filed May 7, 2013 to Non Final Office Action mailed Jan. 7, 2013, 11 pgs.
U.S. Appl. No. 11/322,597, Advisory Action mailed Oct. 27, 2010, 3 pgs.
U.S. Appl. No. 11/322,597, Examiner Interview Summary mailed Apr. 11, 2013, 3 pgs.
U.S. Appl. No. 11/322,597, Non Final Office Action mailed Jan. 7, 2013, 10 pgs.
U.S. Appl. No. 11/322,597, Non Final Office Action mailed Jul. 18, 2013, 6 pgs.
U.S. Appl. No. 11/322,597, Response filed Nov. 29, 2010 to Advisory Action mailed Oct. 27, 2010 and Final Office Action mailed Jul. 30, 2010, 17 pgs.
U.S. Appl. No. 11/322,802, Advisory Action mailed Sep. 21, 2011, 5 pgs.
U.S. Appl. No. 11/322,802, Appeal Brief filed Nov. 17, 2011, 30 pgs.
U.S. Appl. No. 11/322,802, Examiners Answer mailed Feb. 1, 2012, 20 pgs.
U.S. Appl. No. 11/322,802, Final Office Action mailed Jul. 8, 2011, 18 pgs.
U.S. Appl. No. 11/322,802, Non Final Office Action mailed Feb. 3, 2011, 32 pgs.

(56) References Cited

OTHER PUBLICATIONS

U.S. Appl. No. 11/322,802, Reply Brief filed Apr. 2, 2012, 5 pgs.
U.S. Appl. No. 11/322,802, Response filed May 3, 2011 to Non Final Office Action mailed Feb. 3, 2011, 14 pgs.
U.S. Appl. No. 11/322,802, Response filed Sep. 8, 2011 to Final Office Action mailed Jul. 8, 2011, 14 pgs.
U.S. Appl. No. 11/322,802, Response filed Dec. 20, 2010 to Final Office Action mailed Sep. 30, 2010, 12 pgs.
U.S. Appl. No. 11/323,059, Advisory Action mailed Jun. 30, 2011, 3 pgs.
U.S. Appl. No. 11/323,059, Examiner Interview Summary mailed Feb. 16, 2011, 3 pgs.
U.S. Appl. No. 11/323,059, Examiner Interview Summary mailed Jul. 25, 2011, 3 pgs.
U.S. Appl. No. 11/323,059, Examiner Interview Summary mailed Dec. 5, 2011, 3 pgs.
U.S. Appl. No. 11/323,059, Final Office Action mailed Apr. 28, 2011, 11 pgs.
U.S. Appl. No. 11/323,059, Non Final Office Action mailed Sep. 2, 2011, 11 pgs.
U.S. Appl. No. 11/323,059, Notice of Allowance mailed Feb. 14, 2012, 11 pgs.
U.S. Appl. No. 11/323,059, Response filed Feb. 15, 2011 to Non Final Office Action mailed Sep. 30, 2010, 10 pgs.
U.S. Appl. No. 11/323,059, Response filed Jun. 20, 2011 to Final Office Action mailed Apr. 28, 2011, 14 pgs.
U.S. Appl. No. 11/323,059, Response filed Jul. 26, 2011 to Final Office Action mailed Apr. 28, 2011, 14 pgs.
U.S. Appl. No. 11/323,059, Response filed Dec. 1, 2011 to Non Final Office Action mailed Sep. 2, 2011, 17 pgs.
Ensel, C, et al., "An Approach for Managing Service Dependencies with XML and the Resource Description Framework", Journal of Network and Systems Management, vol. 10, No. 2, (Jun. 2002), 147-170.
U.S. Appl. No. 11/322,597, Examiner Interview Summary mailed Mar. 31, 2014, 3 pgs.
U.S. Appl. No. 11/322,597, Notice of Allowance mailed Apr. 16, 2014, 5 pgs.
U.S. Appl. No. 11/322,597, Response filed Apr. 2, 2014 to Final Office Action mailed Jan. 2, 2014, 12 pgs.
U.S. Appl. No. 11/322,597, Examiner Interview Summary mailed Oct. 10, 2013, 4 pgs.
U.S. Appl. No. 11/322,597, Final Office Action mailed Jan. 2, 2014, 7 pgs.
U.S. Appl. No. 11/322,597, Response filed Oct. 18, 2013 to Non Final Office Action mailed Jul. 18, 2013, 10 pgs.

\* cited by examiner

901

```xml
<?xml version="1.0" encoding="UTF-8"?>
<!DOCTYPE template SYSTEM "template.dtd">
<template name="test" number_of_nodes="1" instance_type="j2ee">
    903  <filters>
              <filter filter_action="stop" component_name="*" component_provider="*" component_type="*"/>
              <filter filter_action="start" component_name="jms_provider" component_provider="sap.com" component_type="service"/>
         </filters>
    <jvm-parameters>  905
        <vm-vendor name="sun">
            <platform name="ntintel">
                <parameter name="maxHeapSize" type="memory">
                    <value>512</value>
                    <description> Test description 1 </description>
                </parameter>
            </platform>
            <parameter name="maxHeapSize" type="memory">
                <value>1024</value>
                <description> Test description 2 </description>
            </parameter>
        </vm-vendor>
        <parameter name="maxHeapSize" type="memory">
            <value>2048</value>
        </parameter>
    </jvm-parameters>
        <configuration>  907
            <manager name="ServiceManager">
                <property name="EventTimeout" value="40"/>
                <property name="Test" value="$link{../kernel/Service/properties#EventTimeout} + 20" contains_link="true" computed="true"/>
            </manager>
                <service name="jms_provider" provider="sap.com">
                    <property name="heapUsage" value="0.5"/>
                </service>
                <system-info>
                    <property name="ClusterLazyTimeout" value="($link{../kernel/Cluster/properties#lazy.autoclose.timeout}) + 2000"/>
                </system-info>
            </configuration>
</template>
```

Fig. 9

| | | |
|---|---|---|
| 221 | Start:*:*:* | 1001 |

| | | |
|---|---|---|
| 223 | Stop:application:*:* | 1003 |

| | | |
|---|---|---|
| 225 | stop:services:*:dsr | 1005 |

| | | |
|---|---|---|
| 227 | start:application:microsoft:program1<br>start:service:s?p:dsr | 1007 |

Fig. 10

SYSTEM AND METHOD FOR SYSTEM INFORMATION CENTRALIZATION

FIELD OF THE INVENTION

The field of invention relates generally to the software arts, and, more specifically, to configuring an instance.

BACKGROUND

In previous system configurations system dependent information (such as the number of CPUs and memory available) was statically and redundantly distributed across the cluster. Each node was manually, individually configured with this static system dependent information. Accordingly, when more memory was added to the system each node had to be manually updated to reflect that. The programmer therefore not only had to know what nodes where on the system, but where they were stored (the path) and the proper syntax for defining each node properly.

FIG. 1 illustrates an exemplary system of multiple physical machines. Each physical machine 101, 115 of the system 129 includes at least one instance 103, 113, 117, 119 and node 105, 107, 109, 111, 121, 123, 125, 127. Of course, a physical machine 101, 115, such as a server, developer computer, or personal computer, may have multiple instances 103, 113, 117, 119 with each instance having more than one node 105, 107, 109, 111, 121, 123, 125, 127. In a physical machine utilizing a Java runtime environment, the nodes are Java containers such as J2EE, servlet, etc.

Additionally, each physical machine 101, 115 commonly had different hardware and software components that were not compatible with other physical machines in the system. With each node individually configured to fit a particular machine's setup, it was nearly impossible to move a configuration (as is) from one physical machine to another. For example, if the configuration for a machine_1 101 includes 1024 MB of memory, runs a Microsoft Windows operating system, and a SUN virtual machine one could not simply port this configuration to a machine_2 1115 that has 512 MB of memory, runs a Linux operating system, and uses a IBM Java virtual machine.

When a change was made a machine in a system, nodes where changes should be applied had to be restarted. The VM settings changes will take place only after restarting the whole instance, which can lead to downtime only if the system has only one instance. In many business environments (for example, web services), this downtime can cause not only user frustration at not being able to access needed information or programs, but loss of income for the duration of the machine being offline.

Additionally in prior scenarios, Java parameters were stored in one single property. All child configurations would hide the parameters of their parents, as the child completely overwrites its parent's property. Accordingly, in the single configuration scenario, if the parent's property changed, there would be no way of propagating that change to the child.

A cluster is a group of at least one system. A bootstrap synchronizes the components in the file system (FS) of a cluster. Prior J2EE engine versions stored the information about FS archives deployed in the cluster on the file systems of the cluster nodes. Many times the data on the FS was deleted and it could be restored only by redeployment.

SUMMARY

A system and method for configuration using abstract configuration information is described. In an embodiment, an abstract configuration module acts like an informational proxy between components of a system. The configuration module provides a level of abstraction that allows for some properties to be abstracted instead of being hard coded into each node of the system.

BRIEF DESCRIPTION OF THE DRAWINGS

The present invention is illustrated by way of example, and not limitation, in the figures of the accompanying drawings in which like references indicate similar elements and in which:

FIG. 9 illustrates an exemplary template file;

FIG. 10 illustrates the use of exemplary filters in a model system;

DETAILED DESCRIPTION

Described below is a system and method for computing system administration using an abstract configuration model. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Abstract Configuration Model

As described in the background, previous systems, configurations where completely system dependent. For example, the number of CPUs and memory available, OS, VM, type, etc. were known prior to starting the system and statically and redundantly distributed across the system or cluster. Each node was manually, individually configured with this static system dependent information.

Figure 2:
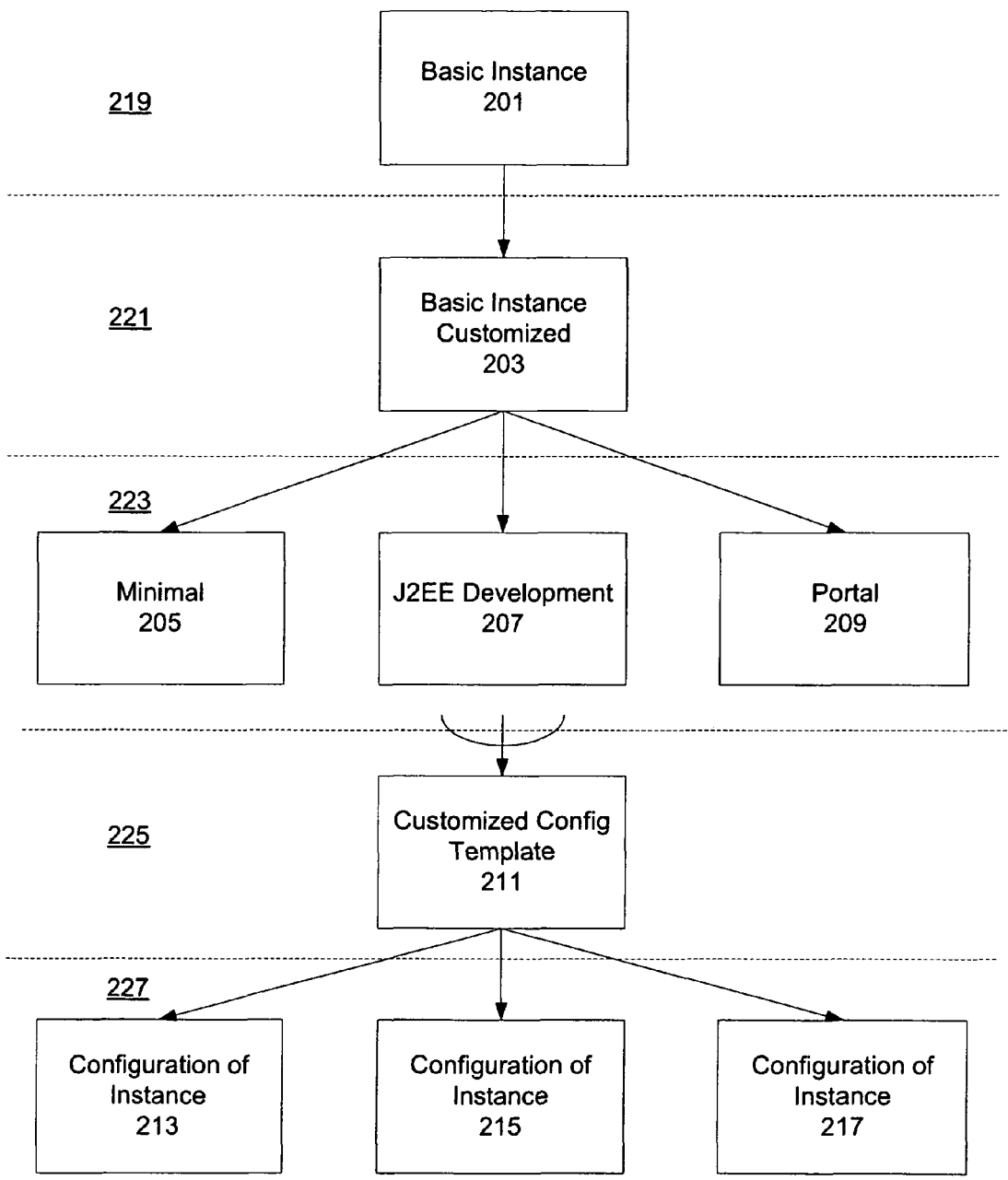
FIG. 2 illustrates one embodiment of a model to abstractly configure an entire cluster (multiple systems) or portions of the cluster dynamically.

FIG. 2 illustrates one embodiment of a model to abstractly configure an entire cluster (multiple systems) or portions of the cluster dynamically. This model is broken into several different levels of abstraction 219, 221, 223, 225, and 227, with each level offering a different level of abstractness. The order of 219, 221, 223, 225, and 227 goes from the highest level of abstraction (219) to the lowest level (227). Additionally, each level of lower abstraction inherits the properties of the level higher than it unless the lower level overwrites the higher level. For example, level 223 inherits the properties of level 221 unless a conflict exists. If a conflict exists, the properties of level 223 control. In an embodiment, the files at each level are written in XML.

A configuration is a collection of settings (properties) that determine the J2EE engine behavior. A configuration of the engine that is level based for allows for greater usability and flexibility. As the smallest entity for configuration is the instance (no explicit configuration for separate server nodes is available and all the nodes inside an instance are configured identically) the structure of the configuration settings on all the configuration levels is the same and represents the instance configuration settings.

The actual configuration structure of the engine in the database is complicated so it is generally not a good ideal to let the users (service manager, administration tools, offline configuration tools) work directly with it. A configuration abstraction layer provides an API which (1) exposes the settings at each configuration level to be accessed in the right access mode (read/write) and (2) hides the real representation and paths of the settings in the database. Further changes on the structure or paths won't affect the users because will be handled by the abstraction layer.

The basic level 219 is the highest level of abstraction. As will be discussed later, the properties at the basic level 219 are used to help define different physical machines of a multiple systems. The basic instance 201 defines the basic structure of an instance configuration for the entire system or multiple systems. The definitions of the basic instance 201 are name-value property pairs that are common to each system. The number of CPUs, amount of memory, location of a Java installation, number of nodes, instance type, thread count, etc. are examples of the names of the pairs. These are configuration constants and are also system parameters. These system parameters are installation dependent and system dependent and may be used as constants in the parameterized values. They are evaluated at runtime depending on the actual system resources of each machine and installation configuration of each instance. However, while the name is defined the value is not defined. This value is defined upon installation and is system specific. The definitions from this instance are applied system wide and generally are not subject to change by an end-user. As will be described later, these settings are common for and inherited by the other configuration levels. All the levels down the inheritance chain get this structure and all the settings already defined from their parent configuration. If there is nothing more changed in the settings on some configuration level the data (settings/properties) it keeps is just the same as the data in its parent level. Effectively the current configuration level is just linked to its parent level and "sees" all the settings defined on the parent level. If there are any changes in the settings of the current level, only these changes are described and written in the level, all the ones that are not changed are still received from the parent via inheritance.

Figure 1:
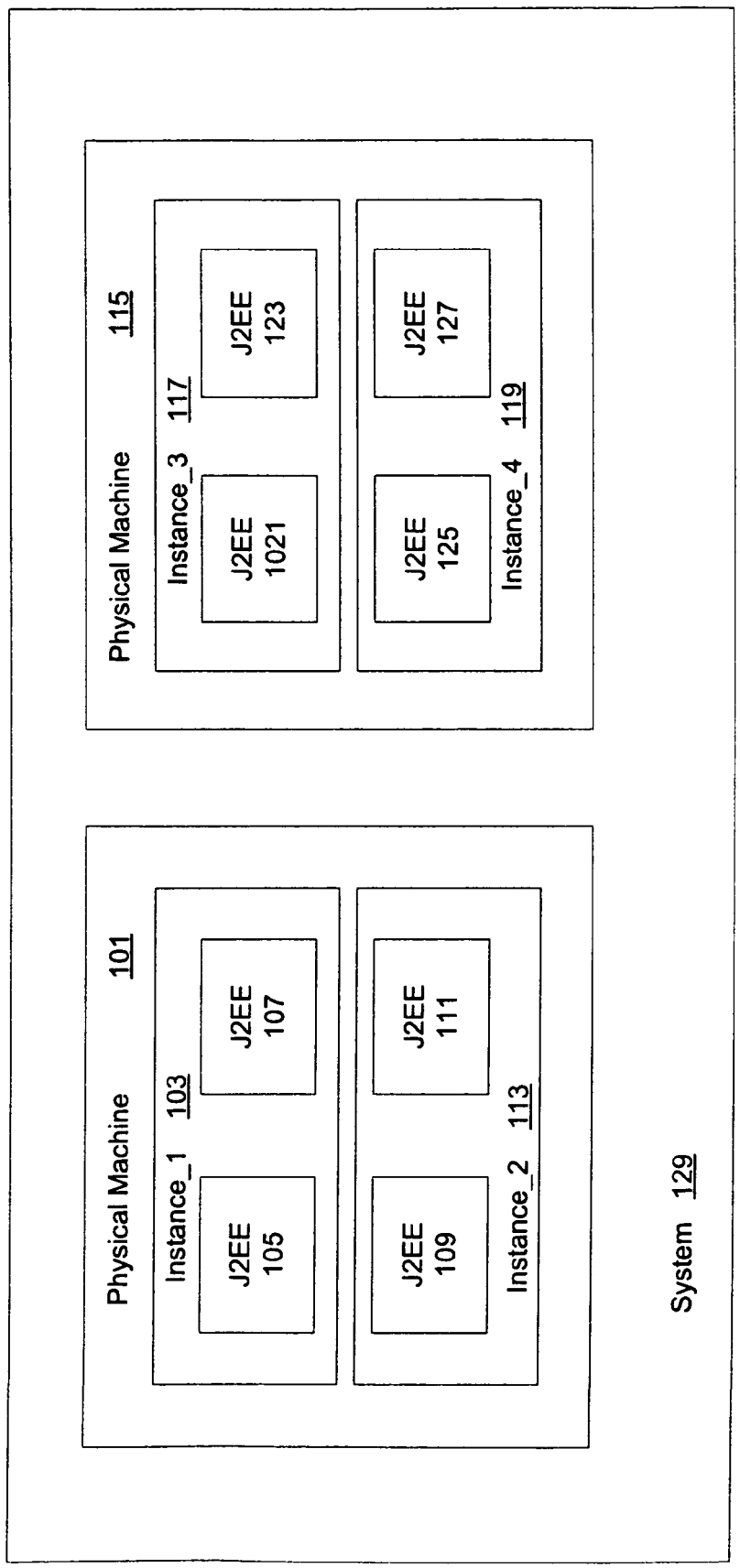
FIG. 1 illustrates an exemplary system of multiple physical machines.

A specific system is described at the system level 221. At this level, a customized basic instance 203 may add system level settings not covered by the basic instance 201 or change existing settings from the basic instance 201. For example, additional name-value pairs may be added and/or the value portion of the basic structure 201 changed. A system may include multiple physical machines, instances, and nodes as illustrated by FIG. 1. Changes made at this level are available globally to the entire system. For example, a change at this level will affect every physical machine 101, 115 of system 129.

Deployable configuration templates for different instance types may be included in the multiple instance (sometimes referred to as the default template) level 223. At this level 223, multiple instance definitions on the same system may be defined and/or reconfigured using configuration templates. These configuration templates contain pre-defined instance configurations for specific use cases and scenarios like portal 209, batch processing, minimal 205, J2EE developer 207, etc. The settings provided at this level are common for the scenario, for the optimal execution of the engine in this scenario, and, in one embodiment, cannot be changed by end users with configuration tools. For example, the number of threads dedicated for HTTP request processing may be different for different scenarios.

While a system may have different types of instances, instances of a single type are normally identically configured. For example, with respect to FIG. 1, the J2EE instances are configured identically. However, if, for example both instances from the same type are running on different machines and one of the machines is really slow or hosts other resource consuming programs it is may be beneficial to change the default configuration and let the engine use only part of the system resources.

Additionally, each container node J2EE, etc.) has one VM. Each template of a type is inheritable by the subsequent instances and/or customized configuration template assigned to it. A configuration template does not usually contain any system dependent information (like number of CPUs) and is therefore system independent. The system dependant information is used in parameterized settings allowing the system to be configured independent from the system resources/JVM/OS. When the engine is started all the parameters are substituted at runtime with the specific values for each machine environment (to be described in detail below).

A configuration template may contain one or more of the following configuration information: (1) An instance layout contains the configuration about the number of server nodes running on this instance. The instance layout may be configured via a simple arithmetic property which specifies the number of server nodes. Thus, the instance layout dynamically adapts itself to the environment on which the instance is running. In a high-end environment an instance will consist of a higher amount of server nodes whereas in a low-end environment (e.g. developer PC) only one server node is usually running on the instance; (2) A virtual machine (VM) configuration contains the VM memory settings and the VM parameters. These settings are again specified in a system independent way via parameterized and computed configuration entries. For example, the maximum heap size may be configured as an arithmetic expression dependent on the amount of physical memory and the number of server nodes running on this instance; (3) A kernel configuration contains the system independent properties of the manager components of the engine. System dependent settings are abstracted via parameterized and computed settings (parameterized and computed settings will be described in detail below); (4) Service settings contain the system independent service properties of each service component which is part of the installation. System dependent settings are abstracted via parameterized and computed settings; (5) An application configuration contains the system independent application configuration of each application which is part of the installation; (6) A cluster file system configuration contains the system independent configuration of the components which are deployed into the file system. The bootstrap process is responsible for synchronizing this configuration (together with the components itself) to the file system. During the synchronization, a configuration manager transparently substitutes dynamic settings; (7) A runtime filter configuration contains the configuration for enabling and disabling components according to the use case/scenario the template belongs to.

As discussed above, the abstract configuration model utilizes configuration templates to pre-define and simplify the configuration of a system. In one embodiment, a configuration template is represented by a single XML file, which is parsed during deployment and its content gets fitted into a dedicated configuration level (level 223). The template may bring in the following information and override the originally deployed values: modified kernel/services properties, modified application properties, modified VM parameters, modified startup filters, number of nodes, instance type, and/or system information centralization settings.

In general, the installation that deploys a template contains many more components than those which are actually used in a specific use case and scenario. The components which are not needed are disabled and those which are needed are enabled via the runtime filter configuration. In a J2EE developer template 207, for example, the runtime filter configuration may disable everything except those components which are needed in a J2EE developer scenario.

The minimal template 205 is used during instance installation and contains elements needed in order to run a central configuration manager which selects and sets the specific use case template for the instance to be configured. This configuration manager may be a J2EE engine service.

Customized scenario templates 211 are in the customized level 225. The template 211 adds or changes settings from what is defined in a configuration template or templates of the system level 223. In an embodiment, the relation between the default scenario based templates and the customized templates is 1:1. In other words, there is a single customized configuration template 211 corresponding to minimal 205 and a single customized configuration template 211 corresponding to J2EE development 207. Changes are visible in all the instances that inherit from this customized template 211. Exemplary uses include the need for customizing additional engine components. Changes on the instance level 227 are made the instance configurations: 213, 215, 217. There may be one or more customized configuration templates associated with each configuration template of level 223.

A customized configuration template for a specific scenario template is created when an instance of this scenario template is to be created. Initially, the customized template is a link to its parent scenario template, i.e. inherits all the settings of the scenario template. For example, the customized configuration template 211 may inherit from the minimal 205, J2EE development 207, and/or portal 209. It is possible this template to be to not need custom changes for the lifetime of the engine. However, if at some point the user needs to make a change in the settings (for example, to add a debug VM parameter or to change some service property) and this change should be effective for all the instances that belong to this scenario template, this change may be done in the customized template. In one embodiment, these changes are done only manually through configuration tools. The result of the change is a locally written setting (name, value pair) for this customized template (all other settings will be still inherited from the hierarchy).

Finally, the configuration of specific instance 213, 215, 217 is finalized at the instance level 227. This is the lowest level in the hierarchy (the least abstract). The settings at the level concern only single instance. The instance settings are gathered from all the levels above having in mind the rule that if there are settings with local values on a certain level they (the local values) are used instead of the inherited ones. On this configuration level are the real/final settings that are used to configure the instance resources and behavior. The changes may be made with configuration tools and are local for the instance (changes to not propagate up to a higher level of abstraction). For example number of nodes could be configured to 1 although the machine has 3 CPUs and the default value is 2*CPU_COUNT.

Specific system parameters (such as the number of CPUs or amount of memory available) are propagated through the configuration model beginning at the basic instance customized, with each subsequent level further defining the details of the instance to be created. In an embodiment, system parameters included in a component separate from the instance.

Levels 221, 225, and 227 make up the custom system configuration. These are the levels where changes can generally be done on the fly by an end user. On the other hand, levels 219 and 223 contain configuration settings common for the engine and common for specific scenarios and are propagated as is and are not normally alterable with custom values. The system configuration contains the configuration of the instances of a deployed system. An instance is assigned to a use case and scenario which is to be executed by the instance during runtime. For example, the system may be a developer system or a server, which are different use cases.

Configuration changes on the level of the custom layer 225 are visible across all instances, which are assigned to the same configuration template. If a setting for a particular instance or instances needs to be changed, the configuration change is done on the instance level 227.

In rare cases, there may be the need to change a setting not only on the level of one usage (for one template), but for the whole system and thus for all usages which are activated in the system. In this case, the configuration change is to be done on the level of the basic instance customized 203 level 221 because that will be propagated throughout the entire system as all instances inherit there configuration from the basic instance customized 203 configuration and thus a configuration change on this level is visible globally (as long as the setting is not locally overwritten).

The above described templates and configurations may be stored in a local (to the physical system) and/or remote configuration database. In an embodiment, they are stored in a tree structure.

Of course it should be understood that other levels of abstraction may be added or some of the levels illustrated in FIG. 2 may be removed without departing from the principles discussed above. Additionally, the specific configurations or templates at a particular level are illustrative and not exhaustive.

Inheritance Principles of the Abstract Configuration Model

The abstract model of FIG. 2 provides for inheritance between levels of abstraction. The information at the highest level of abstraction 219 is passed to the levels below it (221, 223, 225, 227). The system level 221 therefore inherits the configuration settings of level 219. Likewise, level 223 inherits the configurations of levels 219 and 221; level 225 inherits the configurations of levels 219, 221, and 223; and level 225 inherits the configurations of levels 219, 221, 223, and 225.

The semantics of this configuration inheritance scheme applied to the case of lower level of abstraction, configuration B (for example, customized configuration template 211) derived from a higher level of abstraction, configuration A (for example, portal 209), are described below. Configuration content, which does not locally exist in configuration B, but which is available in A will be inherited and thus is visible to configuration B.

In an embodiment, the lower level of abstraction controls if there is a conflict between levels. For example, the local content of configuration B has priority over inherited content from configuration A. Accordingly, when content settings are overwritten in configuration B, the overwritten local content (and not the inherited content from configuration A) will be visible in configuration B.

In an embodiment, the properties of the higher level of abstract are saved before being overwritten by the lower level content. This allows for an easier transition back to an initial state.

The contents of a configuration (including configuration entries, files, sub-configurations) are subject to inheritance. The inheritance relationship is assigned to the whole configuration sub-tree (not to one configuration node only). This means, a local sub-configuration of configuration B (e.g. B/sub) has implicitly an inheritance relationship to the according sub-configuration of configuration A (e.g. A/sub). In an embodiment, this is true in the case where the corresponding sub-configuration in A does not exist. Of course, depending upon the overall model configuration, certain of these contents may be excluded from inheritance.

Template Structure

Figure 3:
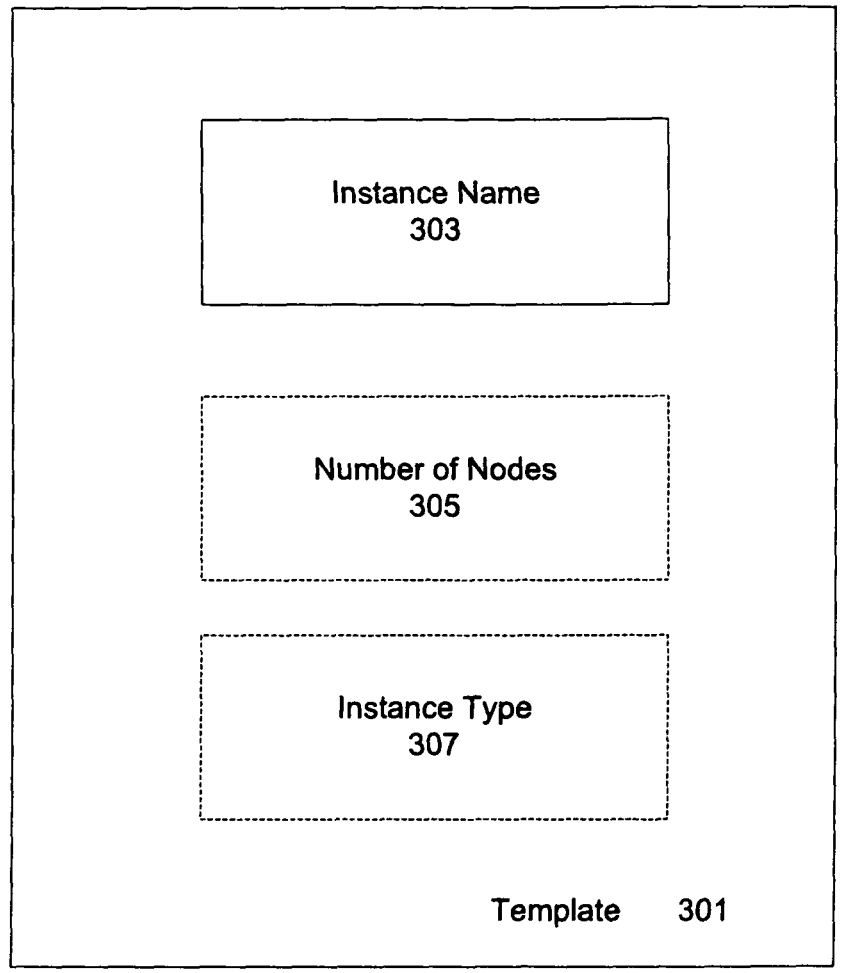
FIG. 3 illustrates an embodiment of the top level of a default template.

FIG. 3 illustrates an embodiment of the top level of a default template. At this top level 301, the template the instance layout is defined. This includes an name for the instance 303 being installed. Additionally, the top level may include the number of nodes 305 of the instance (as described above, this could be done using parameterized values, computed values, or value links) and the type of instance 307 (for example, J2EE, JMS, etc.). Of course, the principles of the default template may be applied to other templates.

Figure 4:
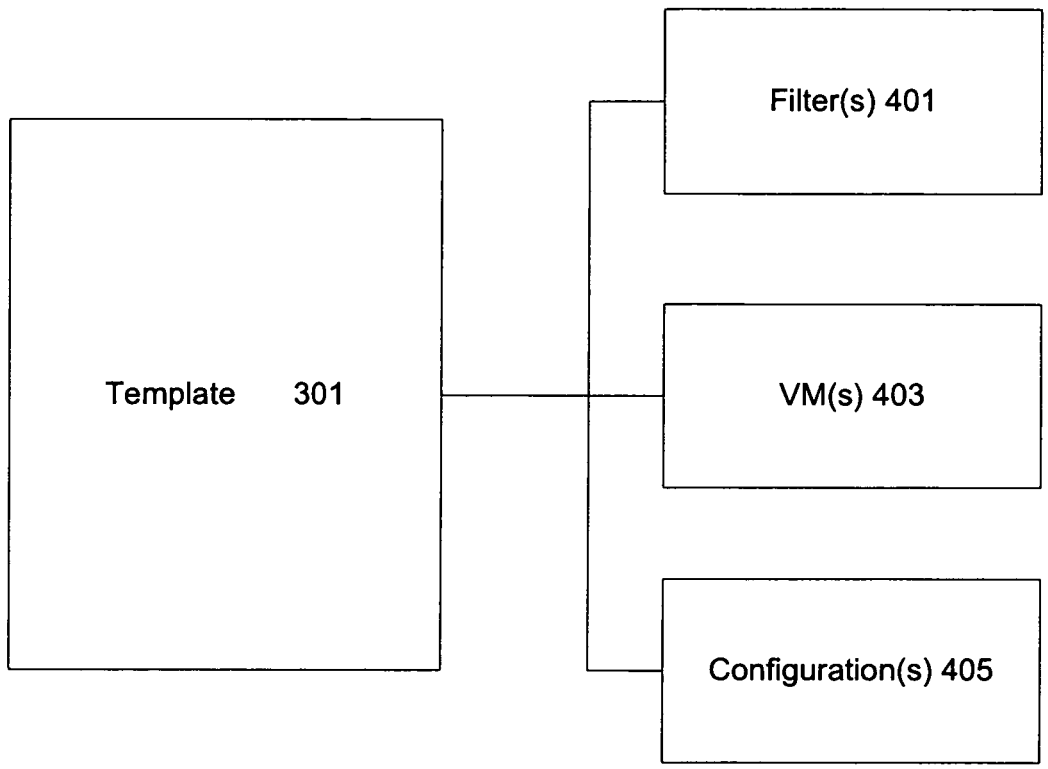
FIG. 4 illustrates an a more detailed embodiment of the types of content of a template.

FIG. 4 illustrates an a more detailed embodiment of the types of content that a default template may describe. Generically, a template may define parameters for one or more of the following: filters 401, virtual machines (VMs) 403, and/or component configurations 405.

VM Settings

For greater flexibilty, VM settings are divided by VM-vendor and platform (operating system (OS)). This division allows for parameters to be specified for any OS/VM (all OSs and all VMs) combination; for any OS, but for a particular VM; or for a particular VM/OS combination.

Figure 5:
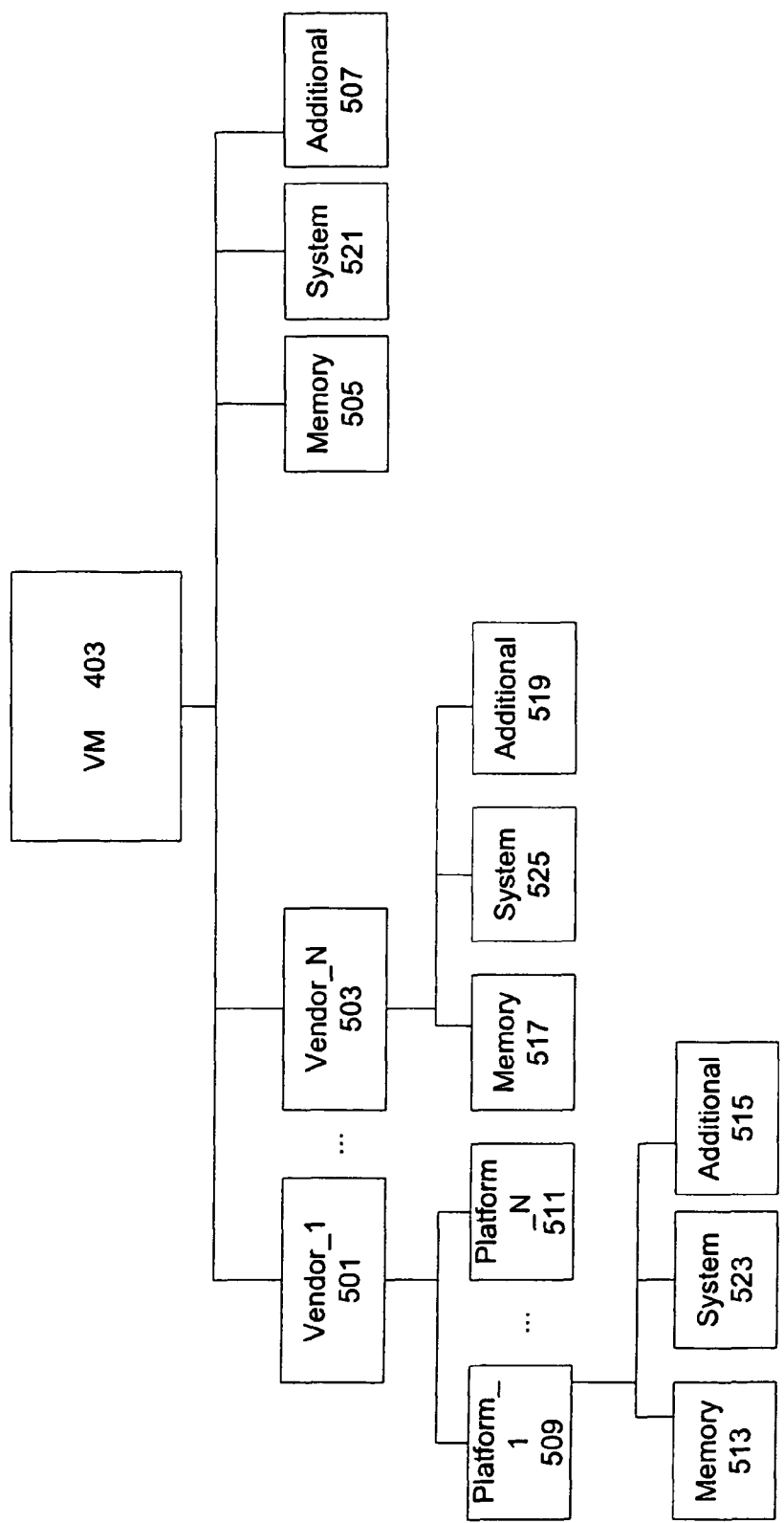
FIG. 5 illustrates an exemplary virtual machine section for a default template.

FIG. 5 illustrates an exemplary VM 403 setup for a default template. As discussed above, multiple vendors 501, 503 and general parameters 505, 507 may be defined under the VM portion of a template. Because there are numerous choices for vendors (SAP, Microsoft, IBM, Sun, etc.) it is important to allow for the broadest number of cases to be available to the template for dynamic system configuration. For example, it is desirable to have a template cover Microsoft and SAP products in a large enterprise environment where both are used extensively.

Of course, even a single vendor may have several different platforms (OSs) that could be deployed. Microsoft alone has several different operating systems in use today and will have even more in the future. Accordingly, a vendor may have multiple platforms 509, 511 described in the VM portion of the template.

Several different parameter value levels may be included under the VM portion of a template. At the broadest level, "global" virtual machine parameters such as 505, 507 are visible (inheritable) and used from any VM/OS combination, unless overridden at a more detailed level. The visibility of a property specified at that level is "all VMs" and "all OSs". For example, the global VM parameters 505, 507, 521 are applicable to any vendor 501, 503 and their particular platforms such as platforms 509, 511 of Vendor_1 501.

Under the VM vendor level, a particular property is visible (inheritable) and used only on a particular VM vendor, but still on all platforms it runs on, unless overridden at a local level there. The visibility of a property specified at this level is "particular VM" and "all OSs". For example, the parameters 517, 519, 525 apply to any of Vendor_1's 501 (particular VM vendor) platforms 509, 511 (all OSs under Vendor_1 501) unless overridden by more specific parameters. Parameters 515, 521, and 507 are examples of parameters that would override the vendor global parameters 517, 525, 519 with respect to Platform_1 509.

Under the platform level a particular property is visible (inheritable) and used only on a particular VM and on a particular platform. It overrides any values of this property, specified at a more generic level. The visibility of a property specified at that level is "particular VM", "particular OS". For example, the parameters 513, 515, 523 are specific to Platform_1 509 (particular OS) which is specific to Vendor_1 501 (particular VM).

A parameter represents a single java parameter of any type. Each parameter may have attributes such as name, type, value, disabled, and description. The type is selected from one of the java parameter groups above. Disabled specifies whether the current setting should be visible (or used by) more concrete (less abstract) configuration levels or not. Value specifies a local value used when overriding inherited values. The description describes what the template sets and/or why.

Dynamic VM Settings

In one embodiment, VM Java parameters are divided into separate groups as shown in FIG. 5 instead of being grouped together as in the prior art. Since configurations may be inherited, if the Java parameters were stored in one single property, all child configurations would hide the parameters of their parents, as the child completely overwrites its parent's property. Accordingly, in the single configuration scenario, if the parent's property changed, there would be no way of propagating that change to the child. Additionally, there would be no way to define relations between parameters using parameterized values or to define different parameters for each platform and VM vendor combination.

The memory group parameters (for example, 513, 517, 505) include name-value pairs (name and number) such as heap size (initial and maximum) and permanent memory size (new and maximum). These pairings may be parameterized, calculated, or contain value links as described above.

The system properties group parameters (for example, 523, 525, 521) includes name-value pairs (name and path) such as the security policy and COBRA information.

The additional properties group parameters (for example, 515, 519, 507) include garbage collection (GC) parameters. Garbage collection is the Java mechanism for removing unused objects from memory.

Properties are generally inheritable as described above. Additionally, properties from the system and additional groups may be disabled. This disablement is propagated down the inheritance chain. In one embodiment, the original value(s) are preserved so that the property can be re-enabled.

Filter Templates

As will be discussed later, runtime filters are used to start or stop components and therefore help define a system. The filters are represented as start/stop rules. In one embodiment, each of the rules has the same structure and attributes. The order in which the filters are evaluated is important, since it may change the complete startup semantics. Each filter can be either in the stop list or in the start list. A first component matching a stop filter will be stopped unless another component that refers the first component is set to be started by a subsequent filter rule. Likewise, a first component matching a start filter will be started unless another component that refers the first component is set to be stopped by a subsequent filter rule. A filter at a lower level of abstraction will overrule the filter at a higher level of abstraction.

Figure 7:
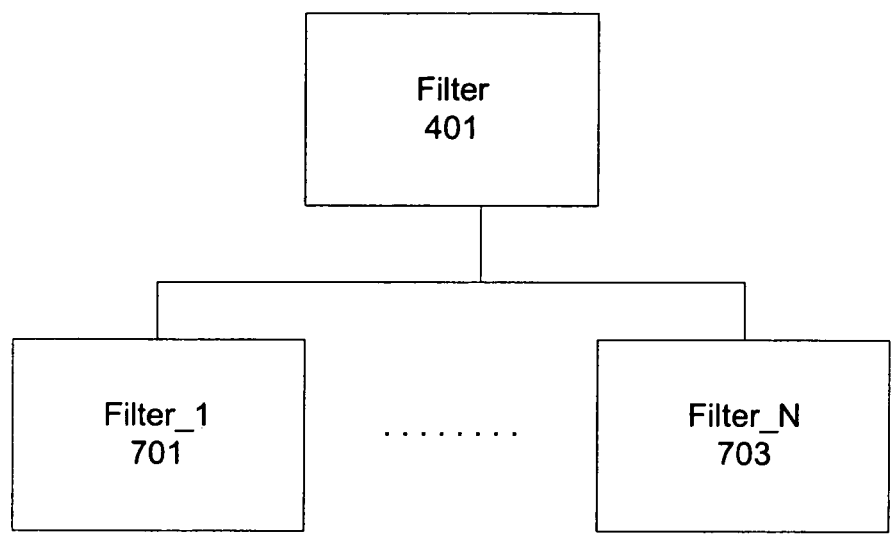
FIG. 7 illustrates an exemplary filter portion of a default template.

FIG. 7 illustrates an exemplary filter portion 401 for a default template. Each filter tag 701, 703 represents one particular rule for filtering components. Each configuration level may have several or no filters present. It can match one or several components, or not match components at all, depending on the specified filter fields and the deployed components. The filter tag may have several attributes such as action (start or stop), component type (library, service, interface, or application), component name, and component provider name.

Component Configuration Settings

A template allows properties of a deployed engine component to be set. Different types of engine components may be set such as applications, managers, services, etc.

Figure 8:
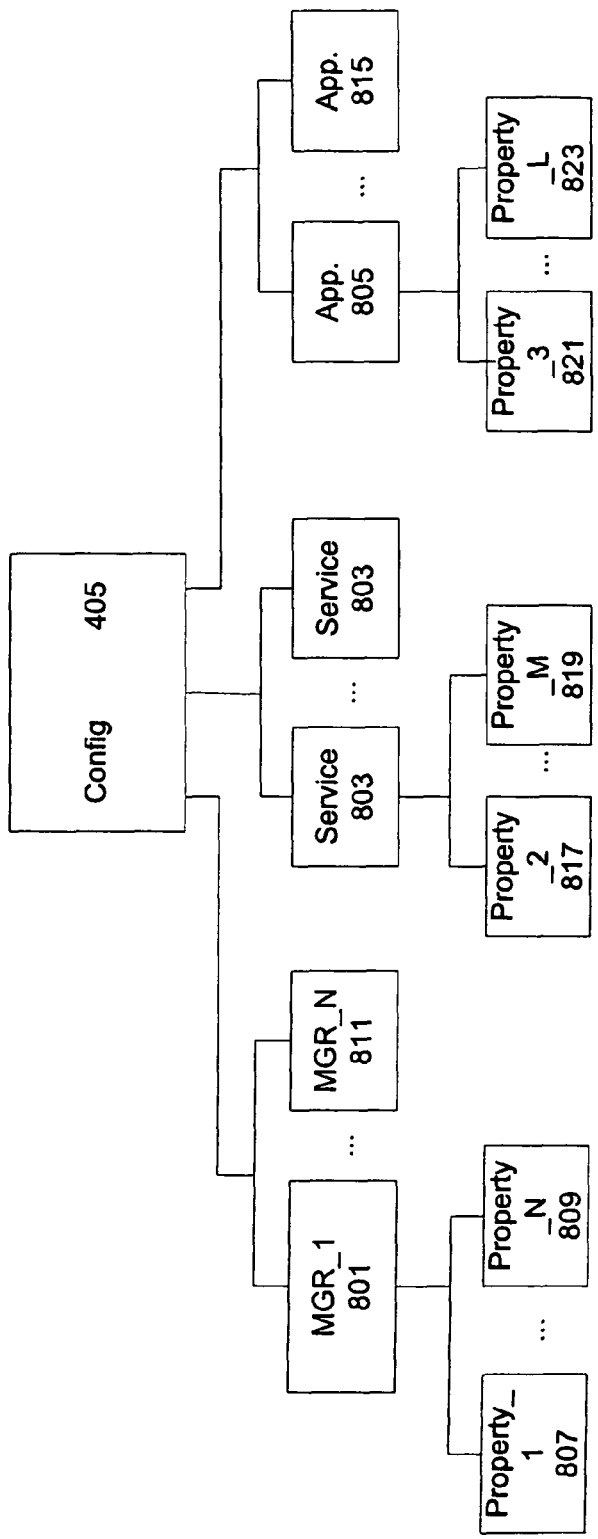
FIG. 8 illustrates an exemplary component configuration portion of a default template.

FIG. 8 illustrates an exemplary component configuration portion 405 of a default template. Each type of component (manager 801, 811; service 803, 813; or application 805, 815, interface, etc.) may be further described by one or more properties. Every component property is described as a property tag containing value and name attributes. The name attribute specifies the name of the property to be changed. The value attribute represents the actual property value you want to specify.

Additional attributes may also be described. For example, a secure attribute indicates whether the property must be encrypted or not; a parameterized attribute indicates whether the property can contain parameterized value and must be passed through a substitution routine; a computed attribute indicates whether the value must be passed through an expression calculator when evaluating or left as it is; a contains link attribute indicates whether a link should be evaluated out of the parameter value; a final attribute forces that a particular property to be unchangeable by a lower level of abstraction; and/or a description attribute contains the description of the particularly added property. Additionally, one may choose to explain inside why this particular value was entered configuration component.

Exemplary Template

FIG. 9 illustrates an exemplary default template file. This particular template 901 is called "test" and is of the instance type J2EE. The definitions of the filters of the template begin at 903. The first filter is a "stop" filter that is applicable to components of any name, provider, or type. It will stop all components from starting. The second filter is "start" filter that overrules a portion of the first filter. This starts the "jms_provider" service component made by sap.com. Filters will be described in greater detail later.

The definitions of the VM parameters of the template are defined beginning at 905. For this particular configuration of an instance, the vendor is Sun and one platform is "ntintel." For this platform the maximum heap size is 512 MB. For other Sun platforms, the maximum heap size is 1024 MB. For other vendors, the maximum heap size is 2048 MB.

The configuration section is begins at 907. The manager is named "ServiceManager" and two properties are set for it. The service is named "jms_provider" and is supplied by sap.com. Finally, a system information property is defined for a timeout value.

Dynamic Configuration of a System Using the Abstract Configuration Model

Previous systems were statically configured. As discussed previously, this approach required tedious maintenance of nodes and detailed knowledge of the computing system that was to be deployed.

Dynamic configuration uses parameterized settings, computed settings, and value links to configure a system. Parameterized settings are used instead of static values for system dependent configuration. These settings are resolvable by simple parameter substitution instead of being duplicated in each instance during runtime or prior to runtime. Parameterized settings are system parameters such as CPU count, OS type (name, 32/64 bit, etc.), memory, etc. These parameters may be transparently (from the user's viewpoint) substituted during runtime. In an embodiment, parameterized settings are stored in a system profile.

Computed settings are simple arithmetic expressions usually containing system parameters from the system profile. During runtime, the parameters are transparently substituted and the arithmetic expression is evaluated. Computed settings may be used when a simple parameter substitution is not sufficient, but instead the value needs to be calculated out of specific system parameters (such as cache sizes, heap size, etc.) For example, the number of nodes in an instance may be CPU dependent. A computed setting such as "number of nodes=2*CPU number" allows for a dynamic number of nodes based on the CPU count, instead of "hard coding" this number in the system, which may change at a later point in time.

Value links contain a link to other settings. These may be used when a setting depends on another setting which is stored somewhere else. During runtime a value link is transparently resolved and substituted. In one embodiment, settings containing value links may be combined with the feature of computed values.

Because of this dynamic configuration approach (since configuration templates may contain the system dependencies in a dynamic way (via parameterized and computed settings)), there is no need to overwrite these settings in the actual instance configuration. The system dependent configuration dynamically adapts itself to the actual system environment. Therefore, the engine runtime itself does not need any additional configuration. It is already functional without overwriting any settings inherited from the configuration template.

System installation provides delivered system database content including J2EE configuration templates (these are the scenario based templates that are meant to be deployed). Furthermore, the installation provides the file system environment for each physical machine.

Instance installation provides the file system environment of the instance and prepares the instance within the configuration database. When installing an application instance, the instance installation itself does not know the particular usage of the instance because of inheritance.

As described earlier, in an embodiment, the central configuration manager is a tool which runs within a J2EE engine. The central configuration manages the configuration of system landscapes via corresponding configuration templates. The scope of a configuration template managed by the central configuration is not only one instance or a group of instances of one system, but a landscape of several systems.

In one embodiment, the J2EE engine configuration templates are available as archive files (such as SDAs). These files are deployed into the J2EE engine before installing and configuring J2EE instances. The central configuration uses the J2EE configuration templates during instance configuration by assigning the instance configuration to the appropriate J2EE configuration template and generates a custom template for this J2EE configuration template and assigns the instances to it.

During installation of an application instance, the usage of the instance is not known. Therefore, during installation, an application instance is configured via the "minimal instance" 205 configuration template. The minimal instance configuration is sufficient to run the central configuration.

The central configuration is used to configure the instance for the specific usage. During this configuration, the instance configuration (within the configuration database) is assigned to the J2EE configuration template according to the particular usage of the instance. The central configuration uses the API (the configuration abstraction layer API) provided by the engine runtime in order to assign the instance configuration to the particular configuration template.

If this is the first instance within the system assigned to the selected usage template, a custom configuration is created for the selected configuration template. The custom configuration is derived from the selected configuration template and the instance configuration is derived from the custom configuration.

As the configuration templates provided within the J2EE engine are system independent (by configuring the system dependent settings via parameterized and arithmetic expressions) most of the settings are already correct and do not need to be touched during instance configuration again. This holds especially for instance layout, VM configuration, kernel configuration and several system dependent application and service settings. Nevertheless, there might be the need for customizing additional engine components.

An instance is essentially configured by traversing through the different levels of abstraction (for example, highest to lowest) until the specific instance is configured. Each level inherits the values of its parent and may overwrite these values and therefore allows for the further customization of the properties/values.

Figure 6:
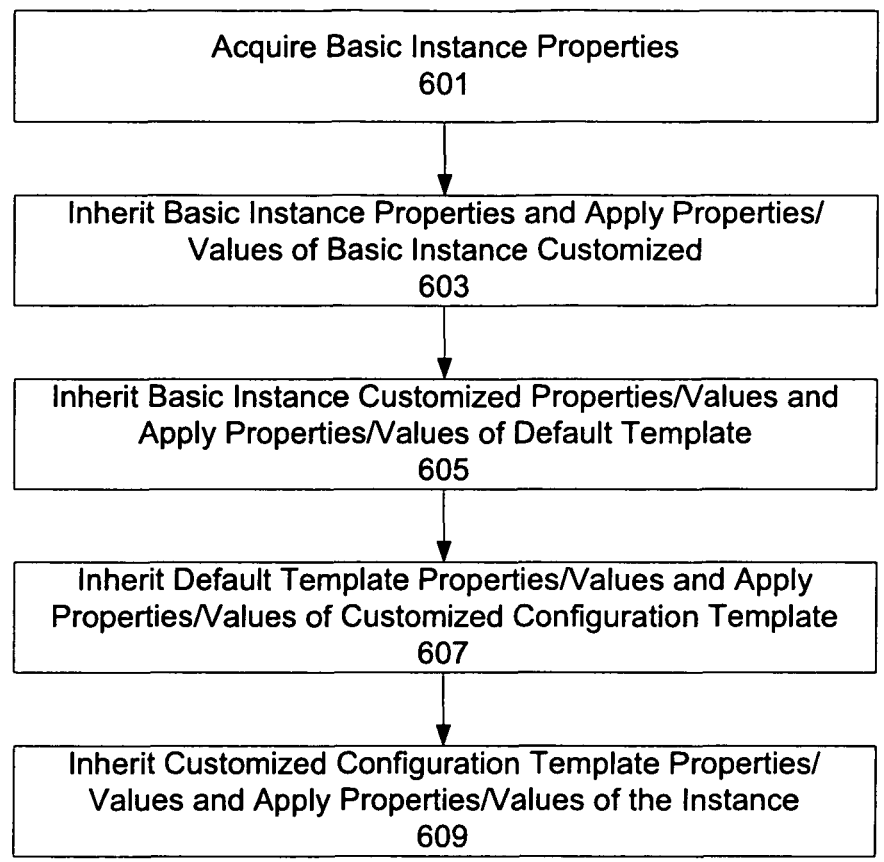
FIG. 6 illustrates an exemplary embodiment of a method to configure an instance.

FIG. 6 illustrates an exemplary embodiment of a method to configure an instance. At 601, the properties of the basic instance are acquired. This defines the basic structure of an instance configuration for the entire system or multiple systems.

At 603, the properties of the basic instance inherited and the properties/values of the basic instance customized are applied to the inherited basic instance. As discussed earlier, this provides for further customization as the basic instance customized provides a lower level of detail than the basic instance. Of course, the properties/values from the basic instance customized take priority (overwrite) over the properties of the basic instance.

The properties/values from the properties of the basic instance customized are inherited and the properties/values of the default template for the specific use case and scenario deployed are applied to the inherited basic instance customized at 605. Again, these values further narrow the values that have already been defined/refined by the basic instance and the basic instance customized.

The properties of the default template inherited are inherited and the properties/values of the customized configuration template are applied to the inherited customized configuration template at 607. Again, these values further narrow the values that have already been defined/refined by the basic instance, the basic instance customized, and the default template.

Finally, the properties/values of the customized configuration template are inherited and the properties/values of the configuration of the instance itself are applied to the inherited properties/values at 609. Again, these values further narrow the values that have already been defined/refined by the basic instance, the basic instance customized, the default template, and the customized configuration template.

As discussed above, certain of these properties/values for the various levels of abstraction are adjustable during runtime and others are preferably not.

Applying Filters with the Abstract Configuration Model

End-users and developers have different needs with respect to what components should be available to use and/or modify. Generally, it is best to hide certain components from the all but expert end-users to prevent modifications that would decrease the performance of the system. Through the use of filters, individual or sets of components may be started or stopped. Generally these filters are applied during startup, however, in an embodiment filters may be evaluated at anytime. The filters may be stored locally using local memory and/or persisted in a database. In one embodiment, filters may also be disabled.

As described earlier, a filter is a template which describes a set of rules for starting or stopping. Filters are definable at each of the abstract levels 221, 223, 225, and 227. The combination of these levels creates a set of rules for starting or stopping components in the system. In one embodiment, the filters from all the levels are collected in a list and are resolved from the top to the bottom. Unlike all the other settings in which the local value overwrites the inherited one, for filtering this is not quite true because all the values are combined and evaluated together. Of course, if there are contradicting filters in the different levels the most bottom (less abstract) one will be executed. In an embodiment, the filters are simply evaluated from the lowest level of abstraction to the highest level but if there is a conflict between levels of abstraction, the lowest level still controls. Additionally, more than one filter may be present for each level of abstraction.

These filters may be predefined (before system deployment) and changed after deployment. Filters are not necessarily tied to any single syntax, however, filters generally include at least the following attributes: action to be performed (start or stop a component); component type (for example, service, library, interface, application); vendor name; and component name. The type attribute specifies the type of the component which this particular filter works on. The component name attribute specifies the name of the component which this particular filter works on. And the vendor name attribute specifies the name of the component provider. For start or stop, all components that match the rule are marked for starting or stopping respectively, including dependents.

In at least one syntax, at least the wildcard characters * and ? may be used for to define at least one of the information in the syntax. The wildcard character * is open-ended. For example, "sap*" means that the filter applies to anything that begins with "sap" and "*" means that the filter applies to everything. The wildcard character ? may be used as a place holder. For example, "s?p" means that any string that begins with a "s" and ends with a "p" and is three characters long is covered by the filter.

In one embodiment, the filter syntax is the following: "action:component_type:vendor:name". FIG. 10 illustrates the use of exemplary filters in a model system. At the default level 221, filter 1001 is defined as "start:*:*:*". This filter turns on all components of every vendor in the system.

At the next level of abstraction 223, the filter 1003 is defined as "stop:application:*:*". As this creates a conflict with filter 1001, this filter overrides the filter 1001 and causes any application to be stopped. Every other component type will still be started.

The filter 1005, at level 225, is defined as "stop:services:*:dsr". This filter stops any service, by any vendor, with the name "dsr." The services that depend on the dsr service will also be stopped. All other services will be started.

Finally, at level 227, filter 1007 is defined as "start:application:microsoft:program1" and "start:service:s?p:dsr"(this is not on the figure). This filter overrides all other proceeding filters with respect to applications made by Microsoft and named "program1". It also overrides services made by any company that begins with the character "s" and ends in character "p" (and is three characters long) and is named "dsr". At this point, all applications not made by Microsoft named "program1" are stopped; all services named "dsr" not made by vendors complying with "s?p" are stopped; and every other component is started.

The complete filter may be built during runtime. This allows for changes to the filter to be updated "on-the-fly" to the system. This is advantageous if a bug is discovered in a component and the component needs to be turned off for a period of time without disrupting the rest of the system.

In an embodiment, the filter is constructed by building and evaluating a graph. The graph is constructed by placing all components at a root level and mapping dependencies. It is evaluated by walking (traversing) the hard references between components (a hard reference indicating dependence) and applying each rule to all components according to their dependencies.

Figure 11:
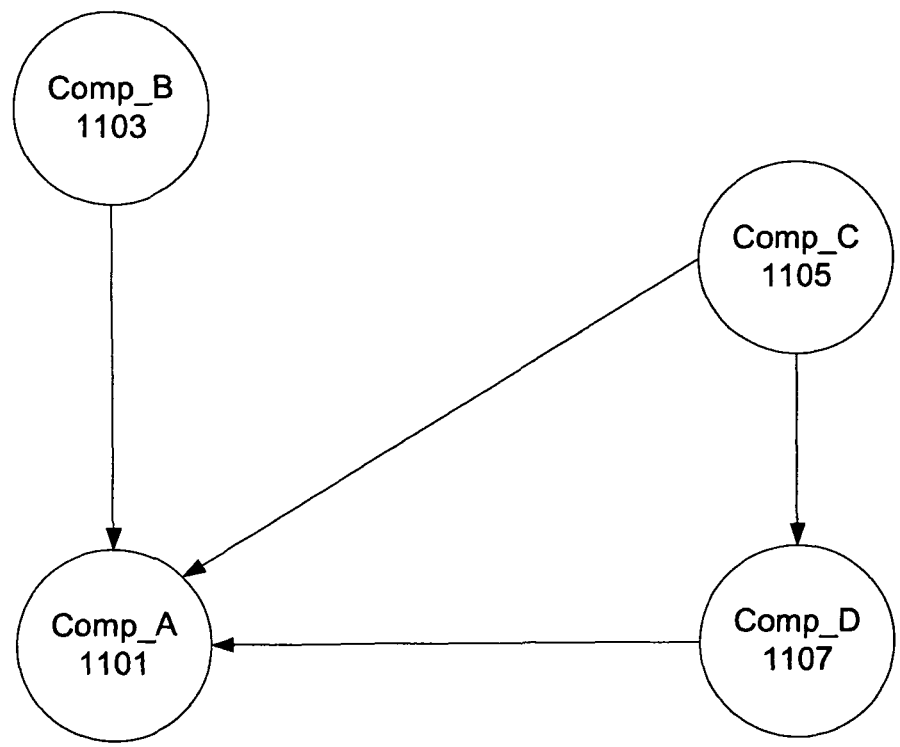
FIG. 11 illustrates an exemplary graph at a root level.

FIG. 11 illustrates an exemplary graph at a root level. This graph includes four components: Comp_A 1101, Comp_B 1103, Comp_C 1105, and Comp_D 1107. Comp_A 1101 has hard references to all of the other components (it is dependent upon all of the components) and Comp_C 1105 has a hard reference to Comp_D 1107 (Comp_C 1105 is dependent upon Comp_D 1007).

In this figure, if Comp_C 1105 is started by a filter, Comp_D 1107 (and only Comp_D 1107) must be started before (or at the same time as) Comp_C 1105. Because Comp_A 1101 depends on Comp_B 1103 and all others, each component must start first (or at the same time) to start Comp_A 1101. Stopping of individual components is done in a similar manner according to dependencies.

System Information Abstraction

In prior systems, properties of software and hardware components in a system were specifically crafted to a particular system and setup. For example, a system configured with a Java VM for Microsoft XP Professional OS running on a system with two CPUs and 1024 MB of memory would have properties crafted for that exact configuration (and no other). This information would be stored at a specific path in the system and would only be relevant for that particular configuration. In other words, it was tied completely with that system. With an abstract configuration model, this may not be efficient if the system configuration could change or be ported to a different system.

Figure 12:
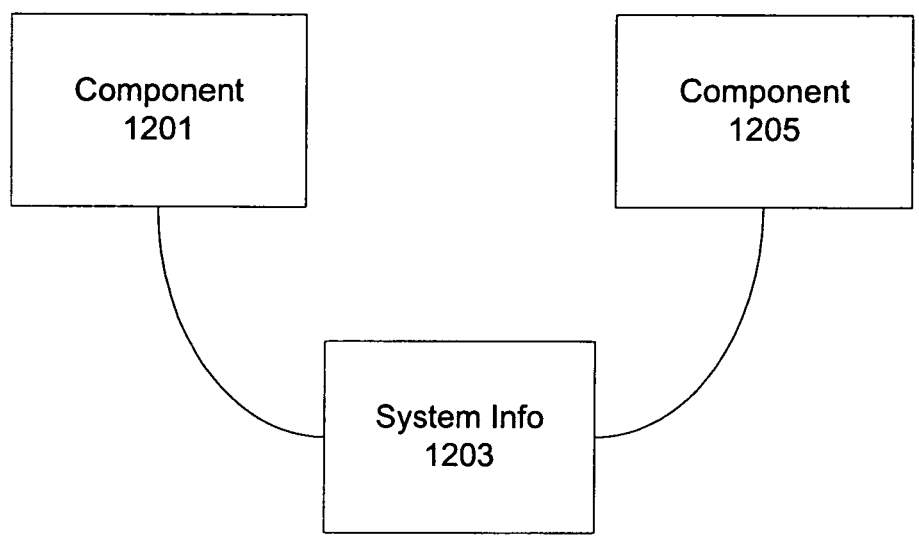
FIG. 12 illustrates an embodiment of configuration using abstract system information.

FIG. 12 illustrates an embodiment of configuration using abstract system information. With this abstract system information configuration, an individual component 1201 does not necessarily need to know that path (location) of other components 1205 in the system. Instead, the components 1201, 1205 of the system use a system information module 1203 as an informational proxy. This system information configuration allows for the location of a particular property to be abstracted instead of hard coded to the system in each node. For example "number of nodes" is not be taken directly found in each instance, but instead is referenced from instances within the system to the system information object.

For example, Component_1 1201 does not need to know where in the structure that Component_2 1205 is located. It only needs to know that a value that it needs may be obtained from system information 1203. Because dynamic configuration is able to use parameterized settings instead of static values for system dependent configuration, settings containing a link to other settings (for example, a value link) may be used for cases where a setting is dependent upon another setting which is stored somewhere else. During runtime the value link is transparently resolved and substituted. With the parameterized value, computed settings may be evaluated.

With the system information object forward compatibility is easier to achieve because all that need to be updated is the system information configuration. For example, if the location or value of a property is changed only the system information object 1203 needs to be changed and not each instance. This will not affect all the components that refer the property, because they use the value provided by system information instead of directly referencing the component which the property belongs to.

The system information module 1203 may be a property sheet object (or equivalent). A property sheet is a configuration that stores property like name-value pairs such as system parameters, global constants, etc. A property sheet may also include paths to specific components.

In one embodiment, a system information property sheet with initial properties exposed in the system (like maximum heap size, number of nodes, and number of threads) is created before all the components of the system become functional.

Additional properties can be exposed by template deployment at runtime as described above.

File System Synchronization Using Bootstrap

The Cluster File System (CFS) is used for deploying a single file system (FS) archive in multiple file systems in a cluster. The CFS serves as a repository for the files deployed on the cluster. A bootstrap synchronizes the CFS components in the FS of the cluster elements. Previous J2EE engine versions stored the information in the FS archives only on the file systems of the cluster nodes. Many times the data on the FS was deleted and it could be restored only by redeployment. Additionally, the proper archive had to be found and deployed. All of this led to extended down-time for the system.

Figure 13:
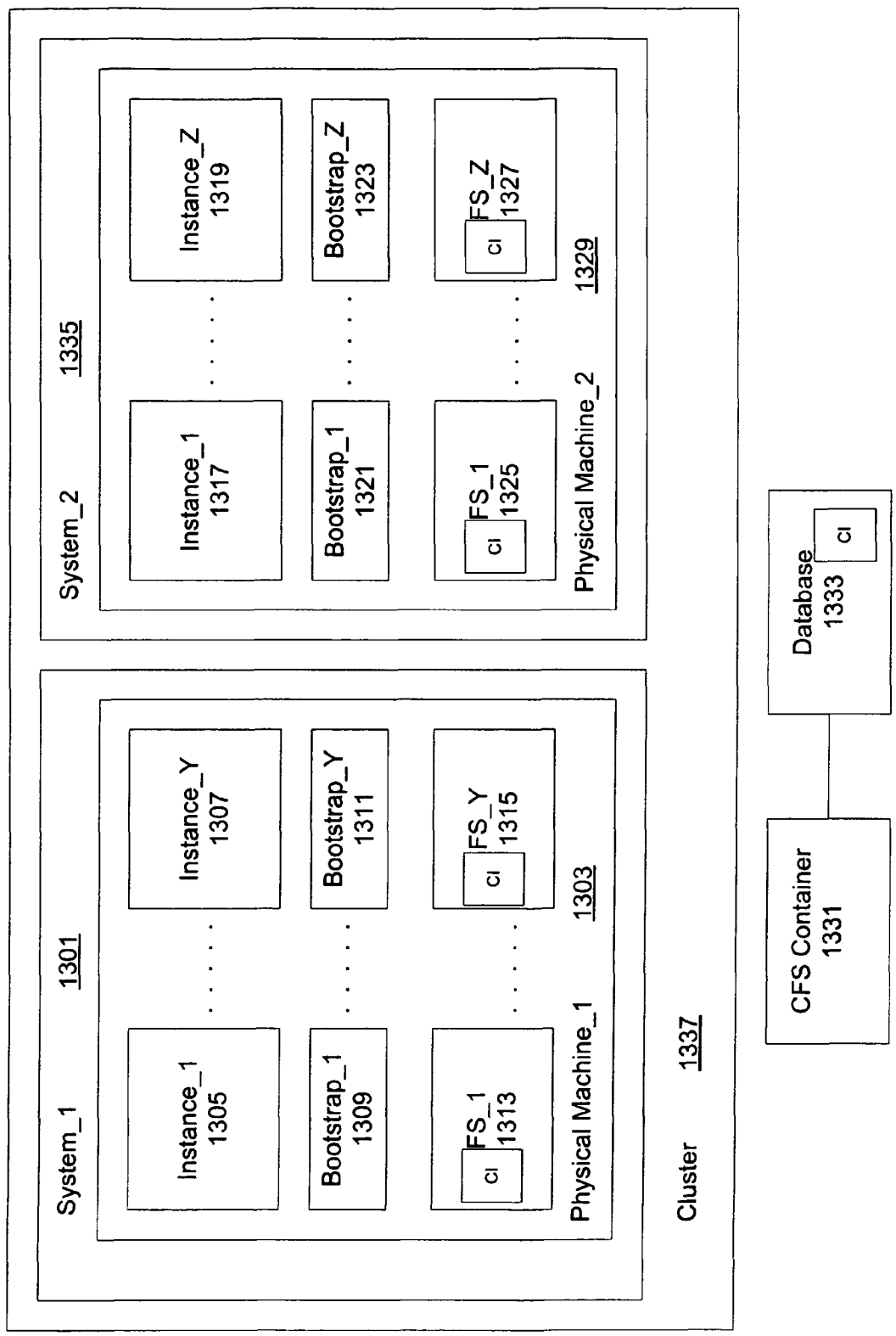
FIG. 13 illustrates an exemplary file synchronization using bootstrap configuration.

FIG. 13 illustrates an exemplary file synchronization using bootstrap configuration. Each system of the cluster 1337 (System_1 1301 and System_2 1335) contains a physical machine 1303, 1329 each having multiple instances 1305, 1307, 1317, and 1319; bootstraps per instance 1309, 1311, 1321, 1323; and local file systems per instance 1313, 1315, 1325, and 1327. Of course it should be understood that a system could have only one physical machine with varying instance or bootstrap numbers, etc. In an embodiment, there is a single bootstrap per physical machine. In another embodiment, there is a bootstrap per instance and/or file system.

Each local file system 1313, 1315, 1325, and 1327 includes a local cache/index that includes checksums and/or version numbers of the archives deployed locally.

A database 1333 includes a global cache/index that includes checksums, version numbers, and paths of the archives deployed in the system 1301. Of course it should be understood that more than one database could store all or part of this information. A CFS container 1331 includes a global counter that is incremented each time an archive is deployed in the system 1301 and archives to be deployed or already deployed.

Figure 14:
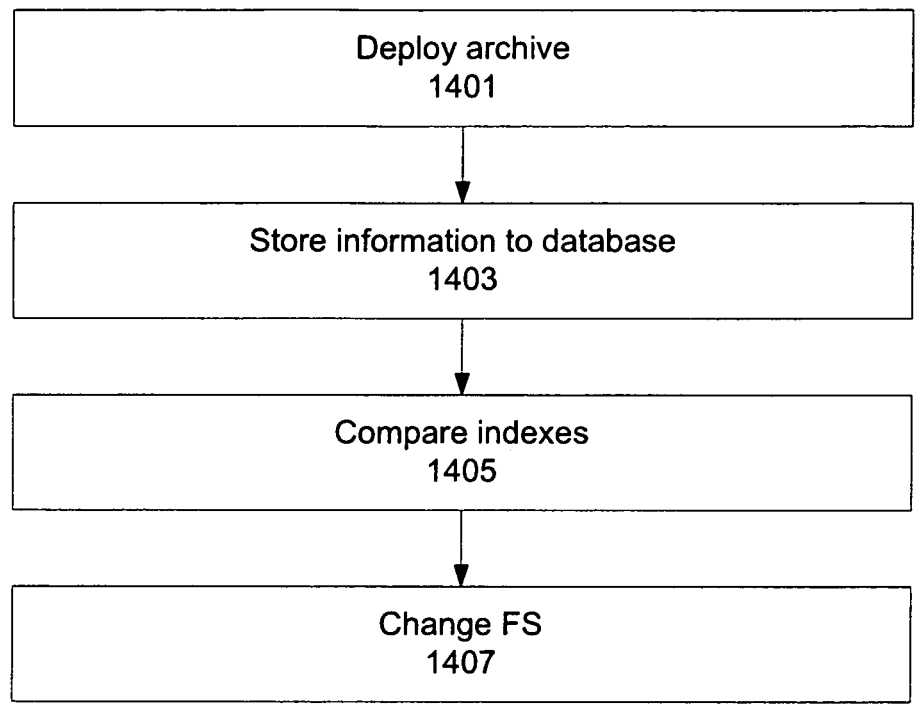
FIG. 14 illustrates an embodiment of a method for using a bootstrap to synchronize a local file system with a cluster file system and database.

FIG. 14 illustrates an embodiment of a method for using a bootstrap to synchronize a local file system with a CFS and database. At 1401, at least one archive is deployed in a local system. In one embodiment, the file system associated with that archive does not note the checksum and/or version number of this archive. In an alternative embodiment, the file system associated with that archive notes the checksum and/or version number of this archive. For example, if an archive is deployed in system_1 1301, on physical machine 1303, in instance 1309, the file system's 1313 local cache reflects this deployment.

At 1403, a database index is configured (or updated) to include the checksums, version numbers, and/or path of the archive deployed in the system. The contents of the deployed CFS archive are also stored in the database. Upon a change made in the system (database or CFS), the bootstrap associated with the change compares the cache indexes its file system and the database for CFS differences at 1405.

Depending on the results of the comparison, changes to the file system are made at 1407 to synchronize the file system with the CFS and database. If the bootstrap cannot read or process the data stored in the database, the CFS component may not properly download into the file system. If there is new component in the database and there is no information for this component on the file system, then the component will be downloaded to the local file system and the local cache/index updated. If the CFS component was deleted from the database, then it will also be deleted from the file system. If there is a component in the database that has newer version or different content compared to the component with the same name on the file system, the bootstrap will update the content of the file system with this updated CFS. If the component on the database is in different directory than the one on the file system, the bootstrap will move the content of the CFS archive in the directory specified in the database.

Closing Comments

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.).

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 15:
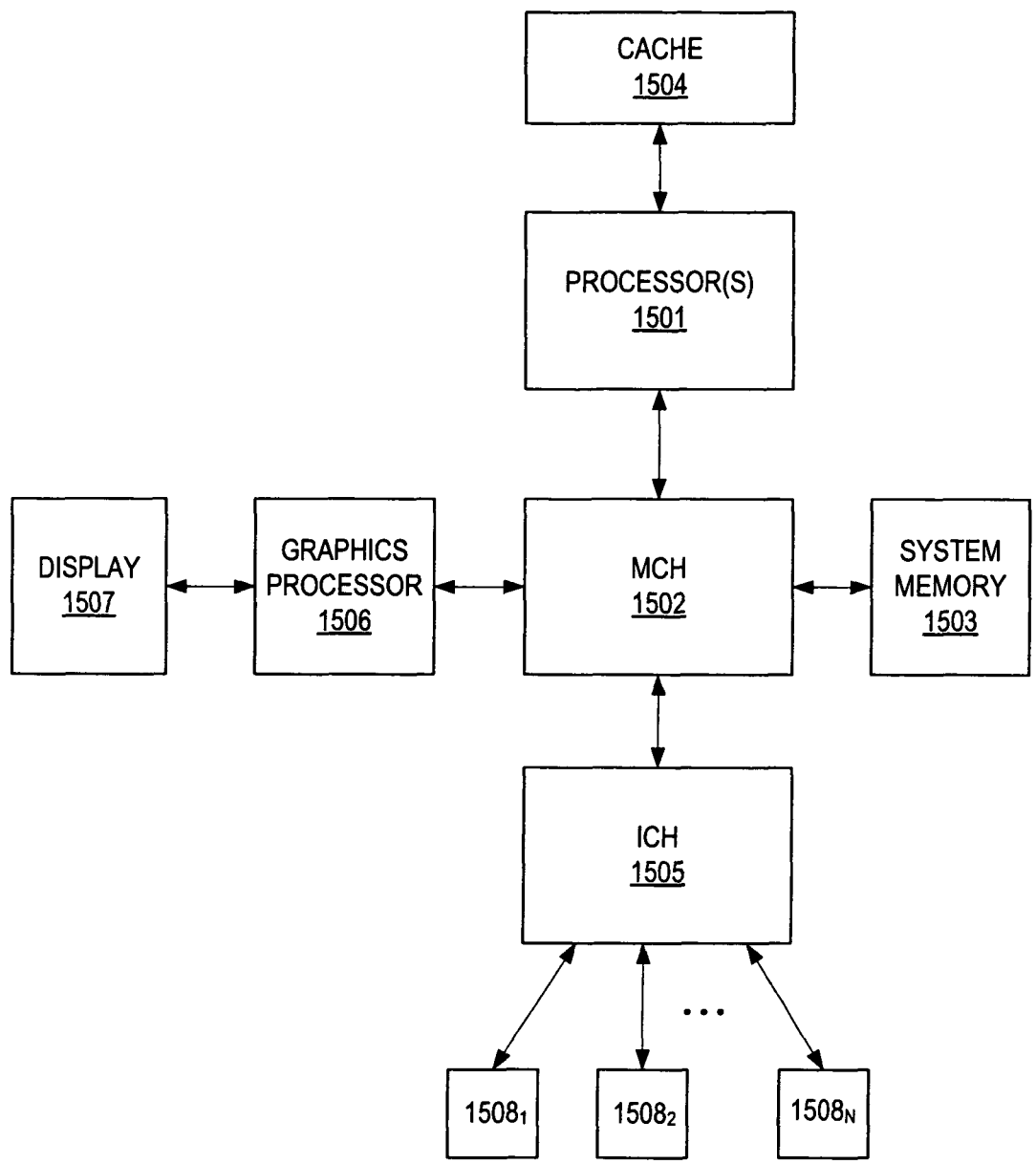
FIG. 15 shows an embodiment of a computing system (e.g., a computer).

FIG. 15 shows an embodiment of a computing system (e.g., a computer). The exemplary computing system of FIG. 15 includes: 1) one or more processors 1501; 2) a memory control hub (MCH) 1502; 3) a system memory 1503 (of which different types exist such as DDR RAM, EDO RAM, etc); 4) a cache 1504; 5) an I/O control hub (ICH) 1505; 6) a graphics processor 1506; 7) a display/screen 1507 (of which different types exist such as Cathode Ray Tube (CRT), Thin Film Transistor (TFT), Liquid Crystal Display (LCD), DPL, etc.; 8) one or more I/O devices 1508.

The one or more processors 1501 execute instructions in order to perform whatever software routines the computing system implements. The instructions frequently involve some sort of operation performed upon data. Both data and instructions are stored in system memory 1503 and cache 1504. Cache 1504 is typically designed to have shorter latency times than system memory 1503. For example, cache 1504 might be integrated onto the same silicon chip(s) as the processor(s) and/or constructed with faster SRAM cells whilst system memory 1503 might be constructed with slower DRAM cells. By tending to store more frequently used instructions and data in the cache 1504 as opposed to the system memory 1503, the overall performance efficiency of the computing system improves.

System memory 1503 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 1503 prior to their being operated upon by the one or more processor(s) 1501 in the implementation of a software program. Similarly, data that a software program determines should be sent from the computing system to an outside entity through one of the computing system interfaces, or stored into an internal storage element, is often temporarily queued in system memory 1503 prior to its being transmitted or stored.

The ICH 1505 is responsible for ensuring that such data is properly passed between the system memory 1503 and its appropriate corresponding computing system interface (and internal storage device if the computing system is so designed). The MCH 1502 is responsible for managing the various contending requests for system memory 1503 access amongst the processor(s) 1501, interfaces and internal storage elements that may proximately arise in time with respect to one another.

One or more I/O devices 1508 are also implemented in a typical computing system. I/O devices generally are responsible for transferring data to and/or from the computing system (e.g., a networking adapter); or, for large scale non-volatile storage within the computing system (e.g., hard disk drive). ICH 1505 has bi-directional point-to-point links between itself and the observed I/O devices 1508.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer-implemented method of configuring components of a computer system, the method comprising:
    requesting a parameterized property from a system information module, wherein one of the components of the computer system is to request the parameterized property and the system information module is an informational proxy storing parameterized properties common to each of the components of the computer system, the system information module including an abstraction level of one or more name-value pairs of parameterized properties, a name of the one or more name-value pairs including one or more physical parameters or locations of one or more of the components of the computer system, a value of the one or more name-value pairs being system dependent and dynamically determined upon installation of the computer system;
    evaluating at least a portion of the one or more name-value pairs at runtime of the computer system;
    receiving the parameterized property from the system information module, wherein the one component is to receive the parameterized property, such that the computer system is to be configured independently of system resources; and
    computing a setting using the received parameterized property to configure the one component.

2. The computer-implemented method of claim 1, further comprising:
    exposing the parameterized property to the system information module, wherein a second of the components exposes the parameterized property.

3. The computer-implemented method of claim 1, further comprising:
    populating the system information module with initial parameterized properties exposed in the system.

4. The computer-implemented method of claim 3, wherein the initial parameterized properties of the system comprise:
    a maximum heap size of the system;
    a number of nodes in the system; and
    a number of threads in the system.

5. The computer-implemented method of claim 1, wherein the system information module comprises a property sheet of the one or more name-value pairs of parameterized properties including global constants and other parameters of the computer system.

6. An article of manufacture including program code which, when executed by a machine, causes the machine to perform a method, the method comprising:
    requesting a parameterized property from a system information module, wherein a first component requests the parameterized property and the system information module is an informational proxy storing parameterized properties common to each component in a computer system, the system information module including an abstraction level of one or more name-value pairs of parameterized properties, a name of the one or more name-value pairs including one or more physical parameters or locations of one or more of the components of the computer system, a value of the one or more name-value pairs being system dependent and dynamically determined upon installation of the computer system;
    evaluating at least a portion of the one or more name-value pairs at runtime of the computer system;
    receiving the parameterized property from the system information module, wherein the first component receives the parameterized property, such that the computer system is to be configured independently of system resources; and
    computing a setting using the received parameterized property to configure the first component.

7. The article of manufacture of claim 6, wherein the method further comprises:
    exposing the parameterized property to the system information module, wherein a second of the components exposes the parameterized property.

8. The article of manufacture of claim 7, wherein the method further comprises:
  populating the system information module with initial parameterized properties exposed in the system.

9. The article of manufacture of claim 8, wherein the initial properties of the system include:
  a maximum heap size of the system;
  a number of nodes in the system; and
  a number of threads in the system.

10. The article of manufacture of claim 6, wherein the system information module comprises a property sheet of the one or more name-value pairs of parameterized properties including global constants and other parameters of the computer system.

11. A system comprising:
  a processor; and
  a memory coupled to the processor, the memory to store:
    a system information module to store parameterized system properties, the system information module including an abstraction level of one or more name-value pairs of parameterized properties, at least a portion of the one or more name-value pairs to be evaluated at runtime of the system, a name of the one or more name-value pairs including one or more physical parameters or locations of one or more of the components of the computer system, a value of the one or more name-value hairs being system dependent and dynamically determined upon installation of the computer system; and
    at least one configuration component to communicate with the system information module to receive the parameterized system properties, wherein the at least one configuration component is arranged to use the parameterized system properties to self-configure, wherein the at least one configuration component of the system is to be configured independently of system resources.

12. The system of claim 11, wherein the system information module includes paths to specific components of the system.

13. The system of claim 11, wherein the system information module comprises a property sheet of the one or more name-value pairs of parameterized properties including global constants and other parameters of the system.

14. The computer-implemented method of claim 5, wherein the property sheet further comprises a link to a parameterized property that is dependent upon another property which is stored in a location other than the property sheet.

15. The computer-implemented method of claim 14, further comprising:
  resolving the link to the parameterized property that is dependent upon another property; and
  receiving the parameterized property associated with the link.

* * * * *